(12) United States Patent
Inamura

(10) Patent No.: US 7,605,948 B2
(45) Date of Patent: Oct. 20, 2009

(54) IMAGE DISPLAY APPARATUS AND CORRECTION METHOD OF IMAGE SIGNAL

(75) Inventor: Kohei Inamura, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 668 days.

(21) Appl. No.: 11/071,167

(22) Filed: Mar. 4, 2005

(65) Prior Publication Data

US 2005/0206958 A1    Sep. 22, 2005

(30) Foreign Application Priority Data

Mar. 18, 2004 (JP) ............................ 2004-078452
Dec. 17, 2004 (JP) ............................ 2004-365531

(51) Int. Cl.
H04N 1/40 (2006.01)
G09G 3/36 (2006.01)
G09G 5/10 (2006.01)

(52) U.S. Cl. .................... 358/3.01; 345/89; 345/690

(58) Field of Classification Search ............... 358/3.23, 358/3.01, 1.9, 1.1; 345/63, 60, 55, 99, 98, 345/87, 84; 348/675, 674, 671, 571
See application file for complete search history.

(56) References Cited

U.S. PATENT DOCUMENTS

| | | | | |
|---|---|---|---|---|
| 5,589,950 A * | 12/1996 | Fujimoto et al. | ............ | 382/270 |
| 6,177,914 B1 | 1/2001 | Iwama et al. | ............ | 345/60 |
| 6,489,938 B1 * | 12/2002 | Ito | ............ | 345/63 |
| 6,501,454 B1 * | 12/2002 | Ozawa et al. | ............ | 345/96 |
| 6,873,308 B2 | 3/2005 | Sagano et al. | ............ | 345/75.2 |
| 6,897,838 B2 * | 5/2005 | Okamoto | ............ | 345/76 |
| 6,987,499 B2 * | 1/2006 | Yamaguchi et al. | ............ | 345/89 |
| 7,046,219 B2 | 5/2006 | Kanai et al. | ............ | 345/75.2 |
| 7,170,477 B2 * | 1/2007 | Okamoto et al. | ............ | 345/77 |
| 2003/0122813 A1 * | 7/2003 | Ishizuki et al. | ............ | 345/211 |
| 2003/0154482 A1 * | 8/2003 | Tsukamoto et al. | ............ | 725/53 |
| 2004/0061709 A1 * | 4/2004 | Park et al. | ............ | 345/690 |
| 2004/0257311 A1 * | 12/2004 | Kanai et al. | ............ | 345/75.2 |

(Continued)

FOREIGN PATENT DOCUMENTS

EP    0 853 307 A2    7/1998

(Continued)

OTHER PUBLICATIONS

Jan. 29, 2008 Japanese Official Action in Japanese Patent Appln. No. 2004-365331 (with partial translation).

Primary Examiner—King Y Poon
Assistant Examiner—Ming Hon
(74) Attorney, Agent, or Firm—Fitzpatrick, Cella, Harper & Scinto

(57) ABSTRACT

An image display apparatus including a plurality of pixels, a drive circuit for outputting drive signals for driving the pixels, and a correction circuit for correcting an input signal corresponding to a predetermined pixel with a correction value to output a corrected input signal to a side of the drive circuit, wherein the apparatus adopts as the correction value a value reflecting drive states of pixels located in the neighborhood of the predetermined pixel, the value being one having received an adjustment according to a nonlinear characteristic between a value of the input signal and a gray-level display of the pixel on the basis of the value of the input signal corresponding to the predetermined pixel.

2 Claims, 11 Drawing Sheets

U.S. PATENT DOCUMENTS

| | | | |
|---|---|---|---|
| 2004/0257386 A1 | 12/2004 | Sagano et al. | 345/690 |
| 2005/0012867 A1 | 1/2005 | Inamura | 348/656 |
| 2005/0062710 A1* | 3/2005 | Kasai et al. | 345/99 |
| 2005/0185099 A1 | 8/2005 | Ohsawa et al. | 348/675 |
| 2005/0206958 A1 | 9/2005 | Inamura | 358/3.23 |
| 2006/0192493 A1 | 8/2006 | Kanai et al. | 315/161 |

FOREIGN PATENT DOCUMENTS

| | | |
|---|---|---|
| JP | 10-198322 | 7/1998 |
| JP | 11-250839 | 9/1999 |
| JP | 11-250840 | 9/1999 |
| JP | 2000-3664 | 1/2000 |
| JP | 2001-13482 | 1/2001 |
| JP | 2003-36049 | 2/2003 |
| JP | 3962728 B2 | 8/2004 |
| JP | 2005-31636 | 2/2005 |
| JP | 396278 B2 | 8/2007 |

* cited by examiner

FIG. 8A

| 0 | 1 | 1 | 1 | 0 |
|---|---|---|---|---|
| 1 | 1 | 1 | 1 | 1 |
| 1 | 1 | 1 | 1 | 1 |
| 1 | 1 | 1 | 1 | 1 |
| 0 | 0 | 0 | 0 | 0 |

FIG. 8B

| 0 | 1 | 1 | 1 | 0 |
|---|---|---|---|---|
| 1 | 1 | 1 | 1 | 1 |
| 1 | 1 | 1 | 1 | 1 |
| 0 | 0 | 0 | 0 | 0 |
| 0 | 0 | 0 | 0 | 0 |

FIG. 8C

| 0 | 0 | 0 | 0 | 0 |
|---|---|---|---|---|
| 0 | 0 | 0 | 0 | 0 |
| 1 | 1 | 1 | 1 | 1 |
| 1 | 1 | 1 | 1 | 1 |
| 0 | 1 | 1 | 1 | 0 |

FIG. 8D

| 0 | 0 | 0 | 0 | 0 |
|---|---|---|---|---|
| 1 | 1 | 1 | 1 | 1 |
| 1 | 1 | 1 | 1 | 1 |
| 1 | 1 | 1 | 1 | 1 |
| 0 | 1 | 1 | 1 | 0 |

Figures 11A, 11B, 11C, 11D, 11E:
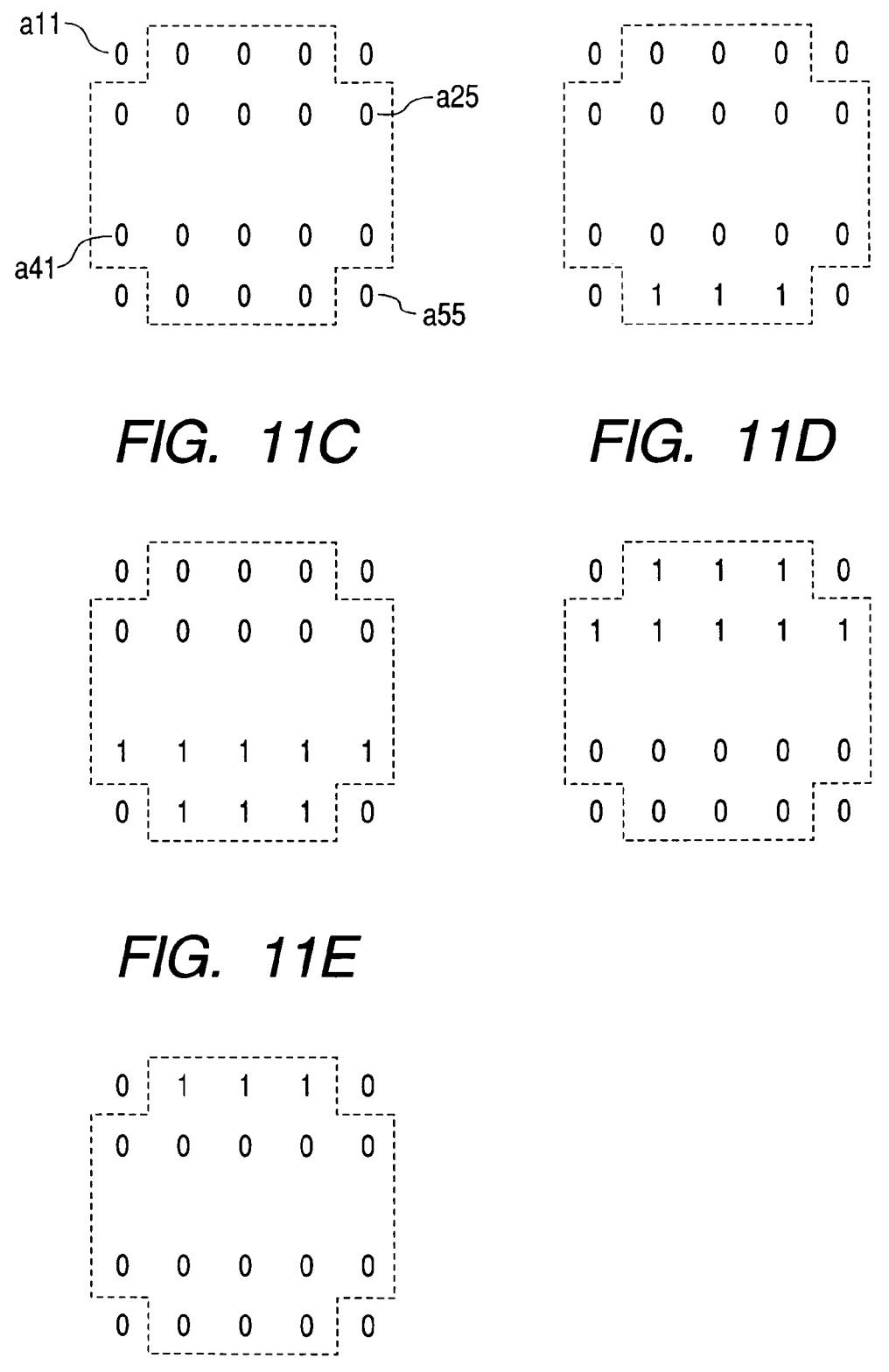

IMAGE DISPLAY APPARATUS AND CORRECTION METHOD OF IMAGE SIGNAL

BACKGROUND OF THE INVENTION

1. Field of the Invention

The present invention relates to an image display apparatus and a correction method of a drive signal, and more particularly the present invention is suitable to be applied to an image display apparatus in which luminous bodies are made to emit light by energy rays.

2. Related Background Art

Conventionally, various kinds of image display apparatuses are known. As image display apparatuses which obtain light emission by the radiation of energy rays to luminous bodies, there are an image display apparatus using electron beams as the energy rays and a plasma display using ultraviolet rays as the energy rays.

As image display apparatuses using electron-emitting devices being electron ray sources, for example, the following configurations are known: the configuration using the so-called spindt type electron-emitting devices including cone-shaped electrodes and gate electrodes located in the neighborhood of the electrodes, the configuration using surface conduction electron-emitting devices as the electron-emitting devices, the configuration using carbon nanotubes as the electron-emitting devices, and the like. As examples of image display apparatuses using such electron-emitting devices, ones disclosed in Japanese Patent Application Laid-Open Nos. H11-250840 and H11-250839 can be cited.

Moreover, the plasma displays using plasma generating devices (or couples of electrodes for generating plasma) have been put on the market already. Furthermore, also the configuration using the plasma generating devices as addresses has been known, and the configuration of such a plasma address display is disclosed in, for example, Japanese Patent Application Laid-Open No. 2001-13482. In the example disclosed in the Japanese Patent Application Laid-Open No. 2001-13482, there is disclosed a method in which the deterioration of an image quality owing to interference between image data of the plasma address display is suppressed by a correction in consideration of the data of pixels causing the interference.

SUMMARY OF THE INVENTION

It is an object of the present invention to provide an image display apparatus and a correction method of a drive signal, both capable of realizing a good image quality.

A first invention according to the present application is an image display apparatus, including:

a plurality of pixels;

a drive circuit for outputting drive signals for driving the pixels; and a correction circuit for correcting an input signal corresponding to a predetermined pixel with a correction value to output a corrected input signal to a side of the drive circuit, wherein the correction value is a value reflecting drive states of pixels located in the neighborhood of the predetermined pixel, the value being one having received an adjustment according to a nonlinear characteristic between a value of the input signal and a gray-level displayed of the pixel on the basis of the value of the input signal corresponding to the predetermined pixel.

As a configuration for performing the adjustment on the basis of the value of the input signal corresponding to the predetermined pixel, a configuration for performing the adjustment by directly using the value of the input signal directly corresponding to the predetermined pixel can be suitably adopted. The following configuration can be also adopted: a configuration for performing the adjustment by using a value obtained by adding or subtracting a very small value to or from the value of the input signal, or a value obtained by multiplying the value of the input signal by a gain in the neighborhood of 1 (the value is not the value of the input signal itself corresponding to the predetermined pixel, but a value available as a value equivalent to the value of the input signal corresponding to the predetermined pixel), namely a configuration for performing the adjustment indirectly based on the value of the input signal corresponding to the predetermined pixel. Furthermore, the following configuration can be also adopted: a configuration for performing the adjustment by directly or indirectly using, as described above, the values of the input signals directly corresponding to the pixels located in the neighborhood of the predetermined pixel as the value of the input signal corresponding to the predetermined pixel by utilizing the fact that input signals corresponding to respective plural pixels located in the neighborhood frequently have values near to one another. Incidentally, in this invention, correction values which have been described above or will be described more concretely in the following are adopted, but the correction values noted here may further include necessary conditions for performing corrections for other objects. Moreover, a configuration for performing other corrections also by using other correction values with a correction circuit or other circuits is not excluded.

Moreover, a second invention according to the present invention is an image display apparatus, including:

a plurality of pixels, each including a luminous body and a device for exciting the luminous body;

a drive circuit for outputting drive signals for driving the devices; and a correction circuit provided at a preceding stage of the drive circuit for correcting an input signal corresponding to a predetermined pixel with a correction value to output a corrected input signal to a side of the drive circuit, wherein the correction value is a value corresponding to a value having received an adjustment of an evaluation value according to a nonlinear characteristic between a value of the input signal and a gray-level displayed of the pixel on the basis of the value of the input signal corresponding to the predetermined pixel, the evaluation value corresponding to an amount of energy rays entering the luminous body of the predetermined pixel, the energy rays generated by drives of the devices corresponding to pixels located in the neighborhood of the predetermined pixel.

That the correction value is the value corresponding to the value having received the adjustment of the evaluation value on the basis of the value of the input signal includes a case where the correction value is a value having received the adjustment of the evaluation value on the basis of the value of the input signal itself (including the case of a value having received the adjustment with a value having a correlation with the value of the input signal (such as the values of the input signals corresponding to the pixels in the neighborhood of the pixel corresponding to the input signal), and/or also including the case of a value also adjusted by a value other than the value of the input signal), a case where the correction value is a value obtained by utilizing the value having received the adjustment of the evaluation value (such as the value obtained by adjusting the evaluation value only with the value of the input signal and the value determined by other values), and a case where the correction value is a value equivalent to the value having received the adjustment of the evaluation value on the basis of the value of the input signal which adjusted value is obtained as a result of another method.

Now, there can be suitably adopted a configuration in which the evaluation value is a value corresponding to an amount of energy rays entering the luminous body of the predetermined pixel, the energy rays generated by drives of the devices corresponding to pixels driven at timing different from that of the predetermined pixel among the pixels located in the neighborhood of the predetermined pixel.

Moreover, there can be suitably adopted a configuration in which the apparatus corrects the input signal corresponding to the predetermined pixel with the correction value so that a gray-level displayed obtained by a corrected input signal is smaller than a gray-level displayed obtained by a not corrected input signal.

Moreover, there can be suitably adopted a configuration in which the apparatus further includes:

shielding members for suppressing incidence of energy rays generated by drives of a part of the devices into luminous bodies neighboring luminous bodies corresponding to the part of the devices, wherein the evaluation value is a value corresponding to energy rays entering the luminous body of the predetermined pixel, the energy rays generated by drives of the devices corresponding to the pixels located in the neighborhood of the predetermined pixel, the energy rays entering the luminous body of the predetermined pixel without being suppressed by the shielding members.

A third invention of the present invention is an image display apparatus, including:

a plurality of pixels, each including a luminous body and a device for exciting the luminous body;

a drive circuit for outputting drive signals for driving the devices;

shielding members for suppressing incidence of energy rays generated by drives of a part of the devices into luminous bodies neighboring luminous bodies corresponding to the part of the devices; and a correction circuit provided at a preceding stage of the drive circuit for correcting an input signal corresponding to a predetermined pixel with a correction value to output a corrected input signal to a side of the drive circuit, wherein the correction value is a value corresponding to a value having received an adjustment of an evaluation value according to a nonlinear characteristic between a value of the input signal and a gray-level displayed of the pixel on the basis of the value of the input signal corresponding to the predetermined pixel, the evaluation value corresponding to an amount of energy rays generated by drives of the devices corresponding to pixels located in the neighborhood of the predetermined pixel with the incidence of the energy rays into the luminous body of the predetermined pixel being suppressed.

For the invention, there can be suitably adopted a configuration in which the evaluation value is a value corresponding to an amount of energy rays generated by drives of the devices corresponding to pixels driven at timing different from that of the predetermined pixel among the pixels located in the neighborhood of the predetermined pixel with the incidence of the energy rays into the luminous body of the predetermined pixel being suppressed by the shielding members, and a configuration in which the apparatus corrects the input signal corresponding to the predetermined pixel with the correction value so that a gray-level displayed obtained by a corrected input signal is larger than a gray-level displayed obtained by a not corrected input signal.

Moreover, in each invention, there can be a configuration in which the correction value is a value corresponding to a value obtained by dividing the evaluation value by a gradient of a characteristic curve in the neighborhood of the value of the input signal corresponding to the predetermined pixel, the characteristic curve indicating a nonlinear characteristic between the value of the input signal and the gray-level displayed of the pixel.

Moreover, the following configuration is also included as the invention related to the present application. That is to say, the configuration is an image display apparatus, including:

a plurality of pixels;

a circuit for calculating a value of evaluation of an amount of energy rays entering a luminous body of a predetermined pixel, the energy rays generated by drives pixels located in the neighborhood of the predetermined pixel;

an adjustment circuit for adjusting the value of the evaluation on the basis of a value of an input signal according to a nonlinear characteristic between the value of the input signal and a gray-level displayed of the pixel;

a circuit for correcting the input signal on the basis of an adjusted value; and a drive circuit for outputting a drive signal for driving the pixel on the basis of a corrected signal.

Moreover, the following configuration is also included as the invention related to the present application. That is to say, the configuration is an image display apparatus, including:

a plurality of pixels;

shielding members for suppressing incidence of energy rays generated by drives of a part of the plurality of pixels into luminous bodies of pixels neighboring the pixel;

a circuit for calculating an evaluation value corresponding to an amount of energy rays generated by drives pixels located in the neighborhood of a predetermined pixel with incidence of the energy rays into the luminous body of the predetermined pixel being suppressed by the shielding members;

an adjustment circuit for adjusting the evaluation value on the basis of a value of an input signal according to a nonlinear characteristic between the value of the input signal and a gray-level displayed of the pixel;

a circuit for correcting the input signal on the basis of an adjusted value; and a drive circuit for outputting a drive signal for driving the pixel on the basis of a corrected signal.

Moreover, as the invention pertaining to the present application, also the following configuration is included. That is to say, the configuration is a correction method of an image signal, including the steps of:

calculating a value reflecting drive states of pixels located in the neighborhood of a predetermined pixel;

adjusting the calculated value on the basis of a value of an input signal corresponding to the predetermined pixel according to a nonlinear characteristic between the value of the input signal and a gray-level displayed of the pixel; and correcting an image signal on the basis of the adjusted value.

According to the present invention, it is possible to provide an image forming apparatus capable of realizing a good image quality.

BRIEF DESCRIPTION OF THE DRAWINGS

FIGS. 8A, 8B, 8C and 8D are schematic diagrams showing the values of the coefficients a11 to a55 according to the first embodiment of the present invention;

FIGS. 11A, 11B, 11C, 11D and 11E are schematic diagrams showing the values of coefficients a11 to a25, and a41 to a55 used for the neighborhood data integrator according to the third embodiment of the present invention;

DETAILED DESCRIPTION OF THE PREFERRED EMBODIMENTS

Figure 1:
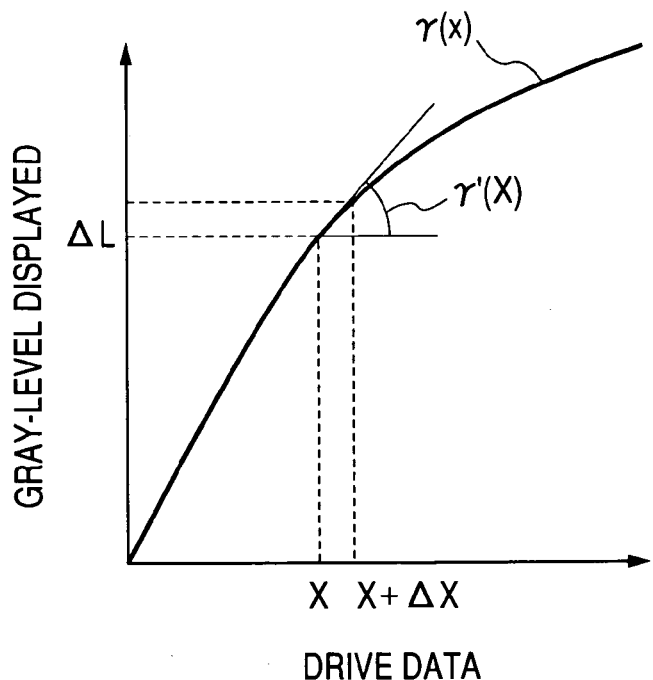
FIG. 1 is a graph for illustrating the luminous characteristic of a phosphor used for an image display apparatus to which the present invention is applied.

The present inventor focused his attention to an image display apparatus in which interference was generated between adjacent pixels, and ascertained that the deterioration of an image quality (such as a shift from aimed luminance and the unevenness of luminance in a screen) owing to the interference was produced. In particular, the present inventor examined a technique especially suitable for improving the deterioration of the image quality. First, the present inventor performed the examination by using an image display apparatus adapted to use electron-emitting devices and luminous bodies disposed with spaces from the electron-emitting devices as the image display apparatus in which such interference between pixels is generated, and to radiate the electrons emitted from the electron-emitting devices to the luminous bodies for making the luminous bodies emit light.

As for the image display apparatus, the present inventor repeated experiments for performing image display by opposing electron sources provided with a plurality of electron-emitting devices to phosphors having different luminescent colors, and then the inventor found that color reproducibility differed from desired states.

To give an actual example, it was found that, in case of using phosphors each having one of the luminescent colors of blue, red and green to obtain light emission of blue by irradiating only the phosphors of blue with electrons, not a light emission state of pure blue but a light emission state including the other colors slightly, or a light emission state including light emissions of green and red concretely, was obtained, namely a light emission state having not good chroma was obtained.

Accordingly, the present inventor concentrated his energies on the researches for the improvement of the image quality. As a result, the inventor ascertained that the cause of the lowering of the chroma found in the conventional image display apparatus using the electron-emitting devices was the generation of undesired light emission caused by the incidence of the electrons not only into a light emission area corresponding to an electron-emitting device but also into the light emission areas of different colors in the neighborhood of the light emission area (including the light emission areas adjacent to the light emission area) which electrons were ones emitted by the electron-emitting device and entering the light emission areas directly or after being reflected by a luminous body or the like corresponding to the electron-emitting device, or ones generated by the electrons indirectly (secondary electrons). Accordingly, the present inventor further executed the examinations energetically. As a result, the inventor found a correction method capable of improving the influences of the undesired light emission by signal processing.

In the following, the embodiments of the present invention will be described with reference to the attached drawings. Incidentally, in all of the drawings of the following embodiments, the same or the corresponding parts are denoted by the same reference marks. Moreover, in the following embodiments, the case of using a surface conduction electron-emitting display (hereinafter briefly referred to as an SED) equipped with surface conduction electron-emitting devices as electron-emitting devices will be described as an example.

Figure 13:
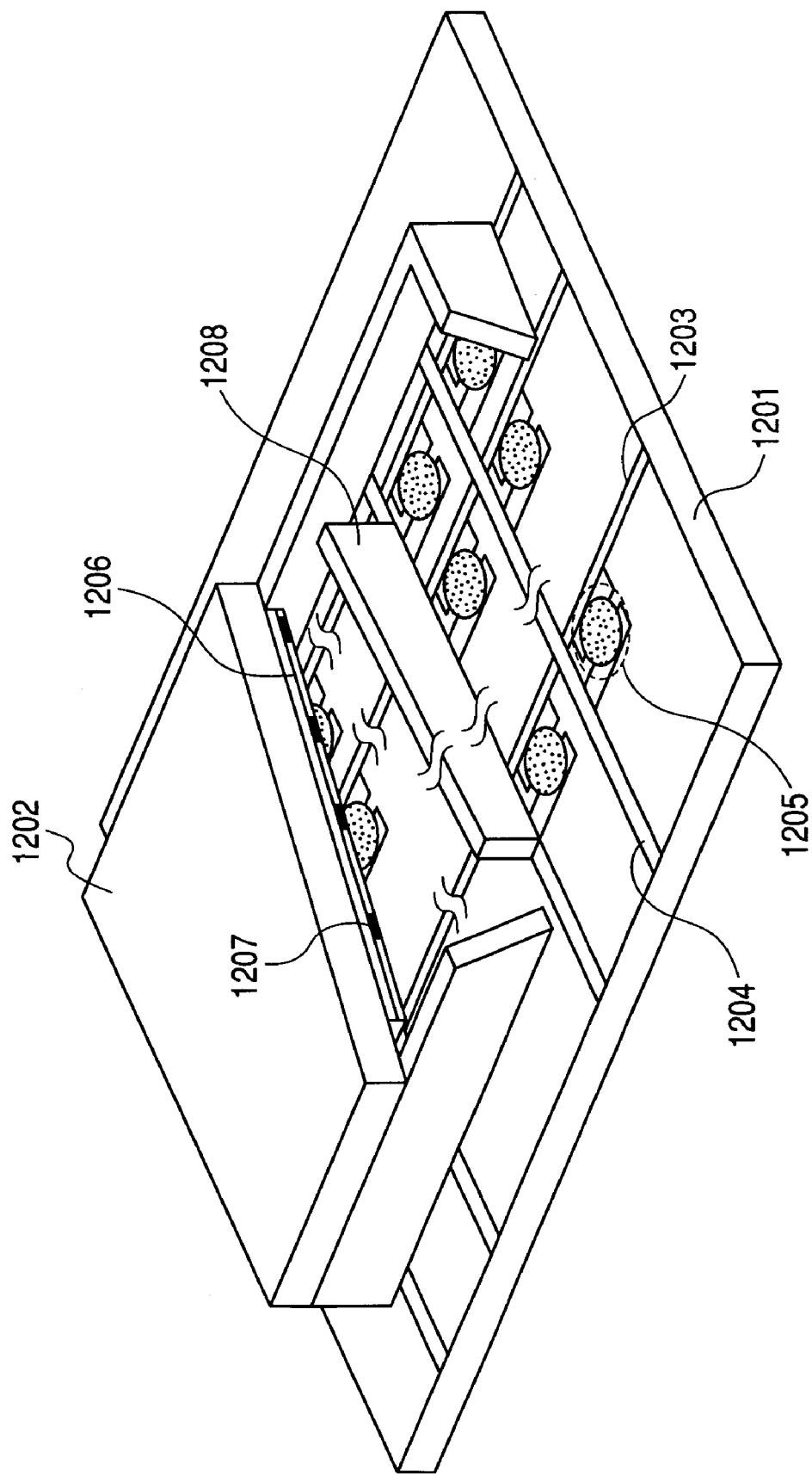
FIG. 13 is a perspective view showing the configuration of a display panel according to the embodiment of the present invention.

First, the whole configuration of a display panel used in the embodiments is shown in FIG. 13.

As shown in FIG. 13, on a glass substrate 1201, which is an insulation substrate, there are formed scanning wiring 1203 being the wiring on which scanning signals are applied, modulation wiring 1204 being the wiring on which modulating signals based on signals having received the corrections to be described in the following are applied, and surface conduction electron-emitting devices 1205 being devices. The scanning wiring 1203 and the modulation wiring 1204 are severally composed of a plurality of wires, and severally form matrix wiring for wiring devices arranged in a matrix. A phosphor 1206 being a luminous body is formed on a glass substrate 1202 being an insulation substrate opposed to the glass substrate 1201. Each area of the phosphor 1206 opposed to each surface conduction electron-emitting device forms the luminous body corresponding to each surface conduction electron-emitting device. Between these luminous bodies black stripes 1207 are disposed.

Incidentally, a black matrix may be disposed in place of the black stripes 1207. Moreover, a configuration in which each luminous body is not comparted with such black stripes 1207 or a black matrix may be also adopted. Although the luminous bodies corresponding to respective devices may be formed to be a luminous body continuing to each other without using the black stripe 1207 or the black matrix, each part corresponding to each device is referred to as a luminous body corresponding to each device even in such a case.

Moreover, in the following embodiments, there will be shown the examples of the application of the present invention to image display apparatuses each composed of a plurality of pixels severally including a luminous body and a device for exciting the luminous body, and a drive circuit for outputting drive signals for driving the devices.

First Embodiment

First, a description is given to a correction method of a drive signal for reducing the lowering of chroma owing to halation (an undesired light emission in a predetermined pixel owing to the drive of (the devices constituting) other pixels) in a surface conduction electron-emitting display according to a first embodiment of the present invention. First, the principle of correction processing by the first embodiment is described.

That is to say, in an SED, when the phosphor of a watched pixel being a predetermined pixel is irradiated by electrons, a light emission in the shape of a circle owing to the halation is generated around the watched pixel. The circular area influenced by the halation is referred to as a "halation area" of the pixel. Conversely, it can be also considered that, when a pixel is lighted in the halation area of the watched pixel, the watched pixel is lighted as the halation by the reflection electrons from the pixel.

Thus, even if the watched pixel is intended to be displayed at a certain degree of luminance, the luminance actually displayed becomes higher owing to the halation from surrounding pixels. Because a rise of the luminance owing to the halation is generated by almost the same degree in each of the colors of red (R), green (G) and blue (B), white results to be added to the original color of the watched pixel, and a fall in chroma is produced.

Accordingly, a correction method according to the first embodiment estimates a rise of the luminance of the watched pixel owing to the halation of surrounding pixels, and corrects the drive data of the watched pixel to deduct the amount of the rise previously. Consequently, the light emission owing to the halation from the surrounding pixels is added when the display is performed actually, and thereby the desired light emission can be obtained to prevent the fall of the chroma. In the following, this respect is described in detail.

That is to say, it is known that the intensity of the reflection electrons owing to the halation is a fixed ratio to the amount of the electric charges irradiating the phosphor and is almost uniform in the circular area in the SED. Moreover, the amount of the electric charges irradiating the phosphor is in proportion to the drive data of a pixel. Consequently, it is possible to calculate the amount of the electron charges entering a certain pixel which electrons are the reflection electrons from the pixels in the neighborhood of the pixel on the basis of the integrated data of the amount of the electron charges based on the drive data of the pixels in the halation area of the pixel.

Incidentally, the present embodiment adopts the amount of the reflection electrons entering the luminous body of the predetermined pixel as a value which reflects the drive states of the pixels located in the neighborhood of the predetermined pixel and is a value obtained by evaluating the amount of the incidence of the energy rays generated by the driving of the devices corresponding to the pixels located in the neighborhood of the predetermined pixel into the luminous body of the predetermined pixel. The reflection electrons have been generated by the driving of the devices of the pixels in the neighborhood of the predetermined pixel. But, the electrons entering the pixel directly from the devices of the other pixels and the secondary electrons produced by the electrons may be considered.

If the calculation of the amount of electron charges becomes possible, the calculation of a rise of the luminance becomes possible on the basis of the relationship between the amount of the electron charges and the luminance. Incidentally, the matters considered in the present embodiment are the luminous characteristics of the phosphors and the drive method of the SED. FIG. 1 schematically shows the luminous characteristic of the phosphor used for the SED according to the first embodiment. Incidentally, in FIG. 1, the dependence of the drive data (abscissa axis) of a pixel to the gray-level displayed (ordinate axis) of the phosphor is shown. Moreover, the gray-level displayed indicates the luminance obtained by integrating the light emission of a phosphor for a frame period.

As shown in FIG. 1, the luminous characteristic of the phosphor is not a linear characteristic. The luminous characteristic has the tendency of being saturated as the drive data becomes larger when the amount of the electric charges to the phosphor increases. To put it concretely, provided that the luminous characteristic is expressed as a function $\gamma(x)$ of the drive data x, the gradient of the luminous characteristic when the drive data is X can be expressed by the differential coefficient $\gamma'(X)$ at x=X in the derived function $\gamma'(x)$ of the function $\gamma(x)$.

Consequently, provided that the gray-level displayed at the time when the drive data is X is denoted by L, a variation $\Delta L$ of the gray-level displayed when the drive data has varied from X by $\Delta X$ is expressed by the following expression (1).

$$\Delta L = \Delta X \times \gamma'(X) \tag{1}$$

From the expression (1), it is deduced that, even if the variation of the drive data is the same, the variation of the gray-level displayed differs according to the magnitude of the original drive data.

Next, the drive method of the SED is described.

Figure 2:
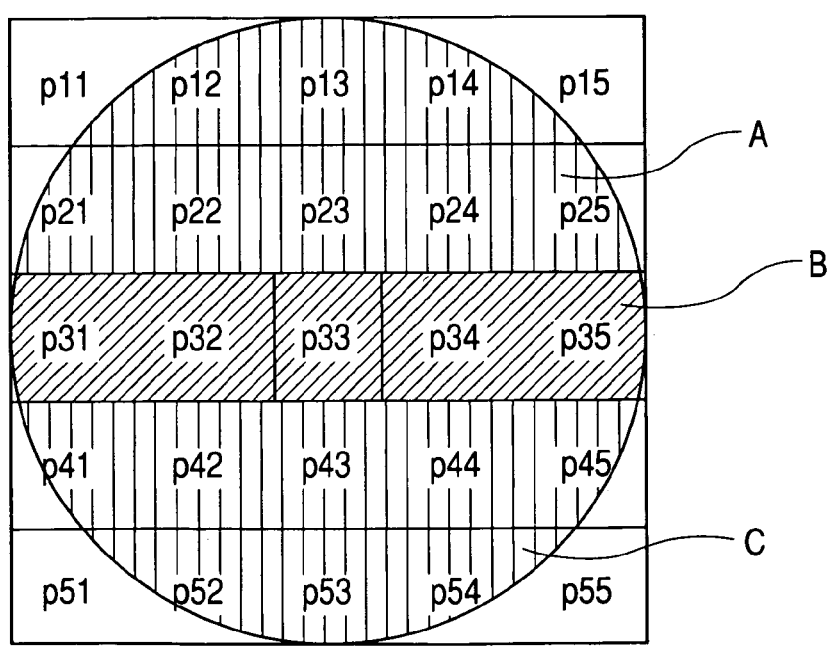
FIG. 2 is a schematic diagram for illustrating a classification of a halation area in the case where the line-sequential driving of an SED according to a first embodiment of the present invention is performed.

FIG. 2 shows a disposition of five pixels in each of length and width around a predetermined pixel p33, which is set as a watched pixel. Incidentally, in FIG. 2, a pixel pnm (n, m: 1 to 5) denotes each pixel around the watched pixel p33. Moreover, because the halation of the SED is a circle, the halation from the pixels existing in the areas A, B and C shown in FIG. 2 influences the watched pixel p33.

In case of adopting a line-sequential driving as the drive method of the SED, pixels on one row are lighted at the same time during a horizontal synchronization period. Then, the pixels on the other rows are put out during the lighting of the pixels on the row. In the state shown in FIG. 2, first, pixels p11 to p15 are lighted at the same time. After that, pixels p21 to p25, p31 to p35, p41 to p45 and p51 to p55 are severally lighted at the same time in order.

That is to say, during the time that the pixels on one row are lighted, the pixels on the other rows are not lighted. Consequently, the reflection electrons of the halation entering the watched pixel p33 are reflection electrons from the pixels in the area B which reflection electrons have been radiated into the phosphor of the watched pixel at the same time when the watched pixel p33 is lighted. On the other hand, the reflection electrons of the halation from the pixels in the areas A and C are radiated into the phosphor of the watched pixel p33 when the watched pixel p33 is not lighted.

Figure 6:
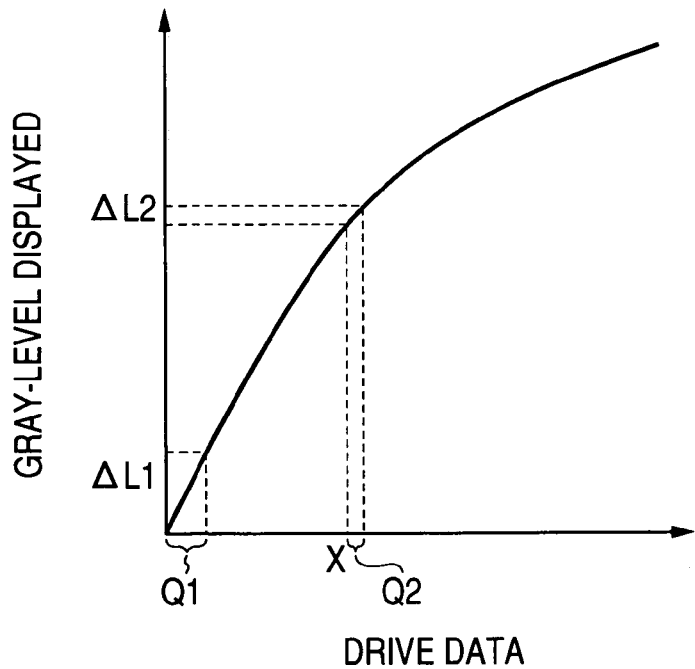
FIG. 6 is a schematic diagram for illustrating a rise of a gray-level displayed owing to the halation generated in the image display apparatus according to the first embodiment of the present invention.

That is to say, a rise $\Delta L1$ of the gray-level displayed owing to the halation from the areas A and C is expressed by the following expression (2) on the supposition that the magnitude of the drive data corresponding to the amount of electric charges owing to the halation is Q1 (see FIG. 6).

$$\Delta L1 = Q1 \times \gamma'(0) \tag{2}$$

On the other hand, as for the pixels in the area B, the reflection electrons are radiated into the watched pixel p33 at the same time as the lighting of the watched pixel p33. Consequently, a rise $\Delta L2$ of the gray-level displayed of the halation from the pixels in the area B is expressed by the following expression (3) on the supposition that the magnitude of the drive data corresponding to the amount of electric charges owing to the halation is Q2 (see FIG. 6).

$$\Delta L2 = Q2 \times \gamma'(X) \quad (3)$$

Consequently, the rise of the gray-level displayed owing to the halation is expressed by the following expression (4).

$$\Delta L3 = \Delta L1 + \Delta L2 \quad (4)$$

The drive data of the watched pixel p33 is corrected so as to deduct the rise of the gray-level displayed. For the deduction, the rise of the gray-level displayed may be divided by the gradient of the luminous characteristic of the phosphor at the drive data X of the watched pixel p33. Provided that the correction amount of the drive data, or the correction value, is $\Delta X$, the following expression (5) is true.

$$\Delta X = \frac{\Delta L3}{\gamma'(X)} \quad (5)$$

Then, when the expressions (2) and (3) are applied to the expression (5), the following expression (6) is obtained.

$$\Delta X = Q1 \times \frac{\gamma'(0)}{\gamma'(X)} + Q2 \quad (6)$$

Now, as described above, the amount of the electron charges owing to the halation at a certain pixel is an amount obtained by multiplying the amount of the electron charges radiated to the phosphor at the pixel by a fixed rate. Consequently, the magnitude of the drive data corresponding to the amount of the electron charges of the halation at the pixel linearly varies.

That is to say, the magnitude of the drive data corresponding to the amount of the electron charges of the halation is the magnitude obtained by multiplying the drive data at the pixel by a fixed ratio. Hereupon, when the ratio is supposed to be a proportionality constant k and the summation of the drive data in the areas A and C of FIG. 2 is supposed to be C1, the following expression (7) is true.

$$Q1 = k \times C1 \quad (7)$$

Moreover, when the summation of the drive data in the area B of FIG. 2 is supposed to be C2, the following expression (8) is true.

$$Q2 = k \times C2 \quad (8)$$

Consequently, the expression (6) is changed to the following expression (9).

$$\Delta X = k \times C1 \times \frac{\gamma'(0)}{\gamma'(X)} + k \times C2 \quad (9)$$

Moreover, when the drive data after the correction by $\Delta X$ of the drive data X is denoted by X', the following expression (10) is introduced from the expression (9).

$$X' = X - \Delta X = X - k \times C1 \times \frac{\gamma'(0)}{\gamma'(X)} - k \times C2 \quad (10)$$

By setting the drive data (drive signal) X' to be a value expressed by the expression (10), desired display luminance can be realized, and the degradation of the chroma can be diminished.

(Correction Circuit)

Figure 3:
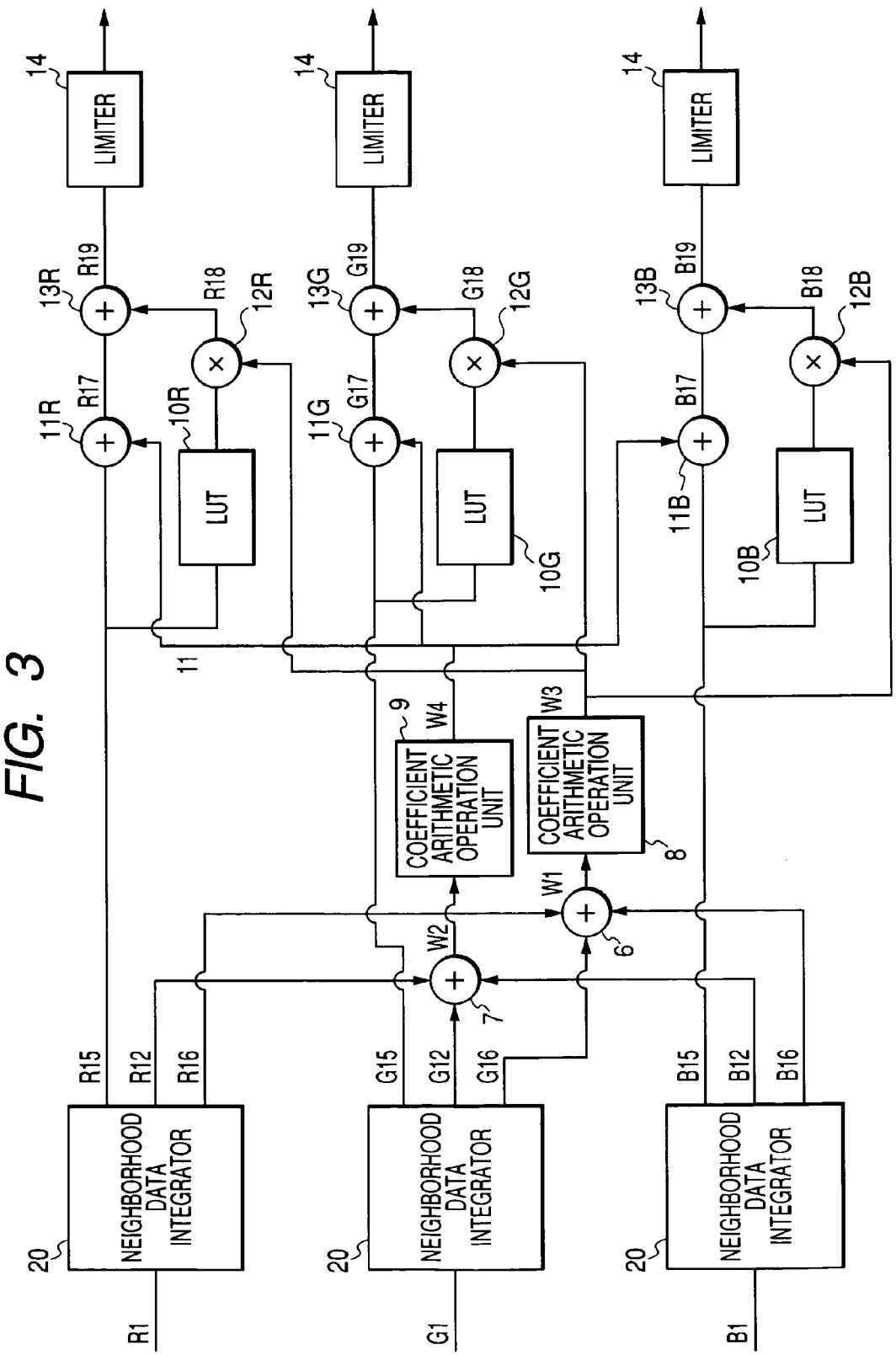
FIG. 3 is a block diagram showing the configuration of a correction circuit of an image display apparatus according to the first embodiment of the present invention.

Next, a correction circuit implementing the correction principle described above is described. FIG. 3 shows the configuration of the correction circuit of the image display apparatus according to the first embodiment.

As shown in FIG. 3, the correction circuit according to the first embodiment is composed of adders 6 and 7, coefficient arithmetic operation units 8 and 9, look-up tables (LUTS) 10R, 10G and 10B, adders 11R, 11G and 11B, multipliers 12R, 12G and 12B, adders 13R, 13G and 13B, limiters 14 and neighborhood data integrators 20.

The neighborhood data integrators 20 are composed of three circuits having the same configurations for R, G and B severally. Then, the neighborhood data integrators 20 are configured in order that the drive data R1, G1 and B1 (input signals for respective colors) of respective pixels of R, G and B before correction may be first input into the respectively corresponding neighborhood data integrators 20. A detailed configuration of the neighborhood data integrators 20 is shown in FIG. 4.

(Neighborhood Data Integrators)

Figure 4:
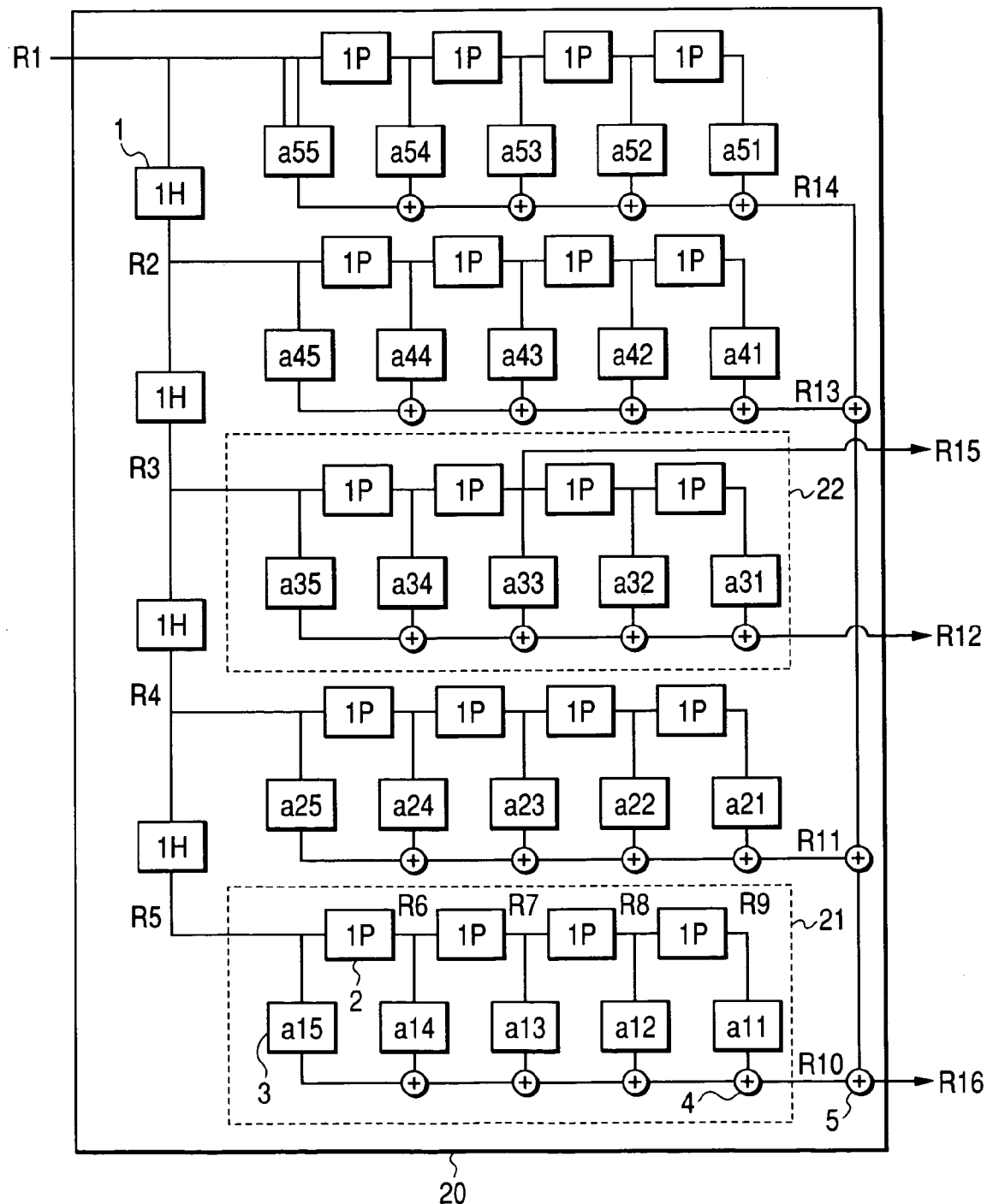
FIG. 4 is a block diagram showing a neighborhood data integrator according to the first embodiment of the present invention.

As shown in FIG. 4, the neighborhood data integrators 20 are severally composed of one-horizontal synchronization period (1H) delay circuits 1, one-pixel (1P) delay circuits 2, multipliers 3 for multiplying data by coefficients, horizontal adders 4 for integrating data in horizontal directions, and vertical adders 5 for integrating the data having been added in the horizontal directions in vertical directions.

Then, in the processing of the neighborhood data integrators 20, drive data R1, G1 and B1 of each pixel of R, G and B before correction is input into the neighborhood data integrators 20, respectively. Incidentally, because the neighborhood data integrators 20 for R, G and B severally have the same configuration, the neighborhood data integrator 20 for R is described in the first embodiment as a representative example.

First, the 1H delay circuits 1 are described. That is to say, the data R1 having input into the neighborhood data integrator 20 according to the first embodiment is delayed by each of the 1H delay circuits 1 by one horizontal scanning period (1H). In the following description, the signal obtained by delaying the data R1 by the one horizontal scanning period (1H) is denoted as a signal R2, the signal obtained by delaying the data R1 by the one further horizontal scanning period (1H) is denoted as a signal R3, the signal obtained by delaying the data R1 by the one further horizontal scanning period (1H) is denoted as a signal R4, and the signal obtained by delaying the data R1 by the one further horizontal scanning period (1H) is denoted as a signal R5.

Image data is normally input from the row data on the upper side of the screen. Consequently, the signal R2 is always the data displayed at a row upper by one to the row of the signal R1 in the screen. Similarly, the signal R3 is the data displayed at a row upper by one to the row of the signal R2, the signal R4 is the data displayed at a row upper by one to the row of the signal R3, and the signal R5 is the data displayed at a row upper by one to the row of the signal R4.

Next, the 1P delay circuits 2 are described. The 1P delay circuits 2 according to the first embodiment are circuits for severally delaying data by one pixel in the horizontal direction.

To put it concretely, when the lowermost row 21 is exemplified, the signal obtained by delaying the input signal R5 by one pixel is a signal R6. Image data is normally input from the data on the left side in the screen. Consequently, the signal R6 is always the image data on the left side of the signal R5 on the screen. Similarly, a signal R7 is the image data on the left side of the signal R6, a signal R8 is the image data on the left side of the signal R7, and a signal R9 is the image data on the left side of the signal R8. Incidentally, the lowermost row 21 is described here, but similar processing is executed by the 1P delay circuits 2 in any row in the neighborhood data integrator 20.

Moreover, it is supposed that the data (hereinafter referred to as watched pixel data) of the central pixel (hereinafter referred to as a watched pixel) in the pixels on the left, right, top and bottom in the neighborhood data integrator 20 is R15. The watched pixel data R15 is the data obtained by delaying the data of the signal R3 horizontally by two pixels. That is to say, the watched pixel data R15 is the data for driving the pixel which has shifted by two pixels to the left side from the display pixel of the data R3, and the watched pixel data R15 is the data for driving the pixel which has shifted by two pixels into lower direction from the display pixel of the data R7.

When the watched pixel data R15 is watched, the data in the inside of the neighborhood data integrator 20 is the data in a rectangle of five pixels in length and width around the watched pixel as the center. That is to say, the neighborhood data integrator 20 is configured to be able to process the data for five pixels in length and width around the watched pixel data as the center.

Moreover, the range of the data processed by the neighborhood data integrator 20 is determined according to the range influenced by the halation. In the SED according to the first embodiment, when electrons are radiated onto an arbitrary phosphor, a circular light emission owing to the halation is generated around the pixel to which the electrons are radiated. Consequently, when the diameter of the circular area influenced by the halation is for n pixels, it is needed to execute processing for n pixels in length and width. Incidentally, in the above description, n is supposed to be five. However, the value of n is determined on the basis of the diameter (range) of the circular area influenced by the halation. For example, when the range influenced by the halation includes only the pixels adjoining to the watched pixel on the left, right, top and bottom of the watched pixel, n may be set to be three. As the value of n, various values can be adopted according to the range influenced by the halation.

Moreover, the diameter of the circular area influenced by the halation is uniquely determined on the basis of the space between the face plate, on which the phosphors are arranged, and the rear plate, on which the electron sources are arranged. Consequently, when the space between the face plate and the rear plate has been known, the range of pixels to which processing is executed can be uniquely determined.

(Multipliers)

Moreover, although the multipliers 3 are ordinarily ones each outputting one signal generated by multiplying two inputs, the multipliers 3 are drawn to be simplified by showing factors by which inputs are multiplied as shown in FIG. 4 in the first embodiment. That is to say, for example, the multiplier 3 to which the data R5 is input outputs an output obtained by multiplying the data R5 by a coefficient a15. Moreover, the neighborhood data integrator 20 is configured in order that the data R6 may be multiplied by a coefficient a14, that the data R7 may be multiplied by a coefficient a13, that the data R8 may be multiplied by a coefficient a12, and that the data R9 may be multiplied by a coefficient a11. Although the processing of the multipliers 3 has been described here with regard to the lowermost row 21 of the neighborhood data integrator 20, similar processing is executed in any row of the neighborhood data integrator 20.

(Horizontal Adders)

Moreover, the horizontal adders 4 are ones for adding data for one row. In the first embodiment, four horizontal adders 4 are provided to each row. Furthermore, because these horizontal adders 4 exist for five rows, 4×5=20 of horizontal adders are required as the horizontal adders 4 in the neighborhood data integrator 20. Incidentally, the data input into the horizontal adders 4 is the signals output from the multipliers 3 described above, and it is the horizontal adders 4 that execute the addition of the data output from the multipliers 3 for one row.

If the processing of the multipliers 3 and the horizontal adders 4 is expressed by an expression by exemplifying, for example, the lowermost row 21 of the neighborhood data integrator 20, the following expression (11) is obtained.

$$R10 = R5 \times a15 + R6 \times a14 + R7 \times a13 + R8 \times a12 + R9 \times a11 \quad (11)$$

The operation processing expressed by the expression (11) is the processing at the lowermost row 21 of the neighborhood data integrator 20. Then, the processing is similarly executed on any row in the neighborhood data integrator 20. Incidentally, the details of the coefficients a11 to a55 will be described later.

The neighborhood data integrated in the horizontal directions in the way described above is added in the vertical direction by the vertical adders 5 except the data of the row 22. Then, when it is supposed that the neighborhood data of each row output from the horizontal adders 4 is denoted by R10 to R14, respectively, as shown in FIG. 4, an output value R16 of the vertical adder 5 can be expressed by the following expression (12).

$$R16 = R10 + R11 + R13 + R14 \quad (12)$$

The expression (12) shows the data obtained by integrating the products of the multiplication of the image data driven at the timing different from that of the watched pixel among the neighborhood data of the watched pixel by the coefficients. On the other hand, the data R12 of the row 22 excepted from the calculation described above is obtained by integrating the products of the multiplication of the pixel data driven at the same timing as that of the watched pixel among the neighborhood data of the watched pixel by the coefficients. Now, the coefficients a11 to a55 of the neighborhood data integrator 20 are described.

Figure 5A:
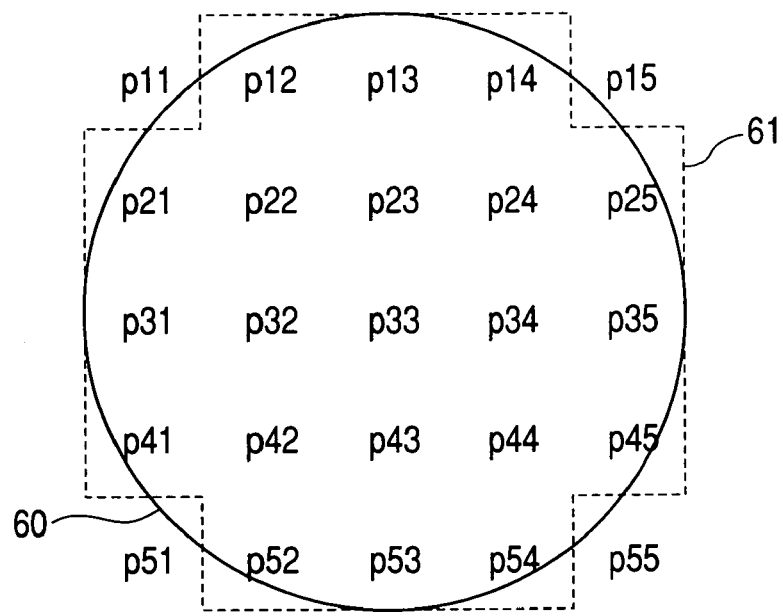
FIG. 5A is a schematic diagram showing a pixel arrangement in the periphery of a watched pixel according to the first embodiment of the present invention.

FIG. 5A shows an arrangement of five pixels along the vertical direction and the horizontal direction around the watched pixel p33, which is the area generating the halation to the watched pixel p33. Incidentally, in FIG. 5A, a reference mark pnm (n, m=1 to 5, p11 to p55) severally denotes a pixel. Then, it is supposed that the coefficients by which the data of the pixels p11 to p55 is multiplied are a11 to a55, respectively, at certain timing.

As shown in FIG. 5A, the halation area in which the halation is generated at the watched pixel (p33) is a circle in the SED according to the first embodiment. The halation area to the watched pixel p33 is exhibited by a solid line 60. Then, for simplifying the coefficients a11 to a55, as to the pixels located in the circular halation area, the solid line 60 is approximated by a dotted line 61.

Figure 5B:
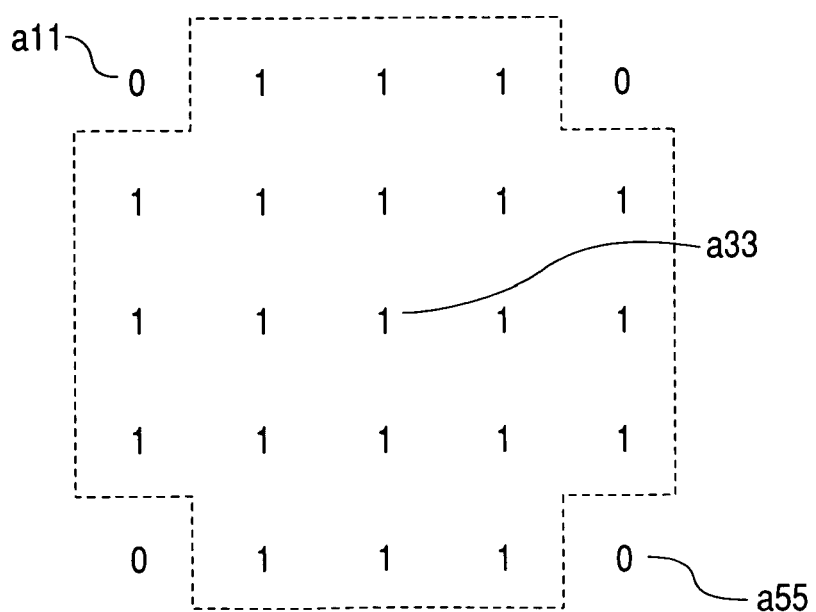
FIG. 5B is a schematic diagram showing the values of coefficients a11 to a55.

Moreover, in the first embodiment, the values of the coefficients a11 to a55 take either value of 0 and 1. Then, the coefficients of pixels capable of causing the halation light emission of the watched pixel are severally 1, and the other coefficients are severally 0. Moreover, because the pixels capable of causing the halation light emission of the watched pixel are ones within the dotted line 61 shown in FIG. 5A, the coefficients a11 to a55 are determined as shown in FIG. 5B. Incidentally, in FIG. 5B, an upper left position indicates the coefficient a11, a lower right position indicates the coefficient a55, and the center position indicates the watched pixel a33. Moreover, a dotted line indicates the range of an approximated halation area similarly to FIG. 5A.

Although the area of the pixels which can cause the halation light emission to the watched pixel is supposed to be the area composed of 5×5 pixels, the former area is not necessarily limited to the latter area. In the case where the area of the pixels capable of generating the halation in the watched pixel is the area composed of 3×3 pixels, the coefficients of the pixels on the left, right, top and bottom of the watched pixel, namely a23, a32, a33, a34 and a43, may be set to be 1, and the coefficients of the other pixels may be set to be 0. Incidentally, in the case where the reflection electrons of the watched pixel (p33) are not radiated onto the watched pixel itself, the coefficient a33 corresponding to the watched pixel may be set to be 0.

Moreover, in the SED, the halation light emission is generated in a circular area around a bright spot. It is known that the intensity L1 of the halation light emission is almost uniform over the pixels in the circular area. Consequently, all of the coefficients in the circular area take the same value.

By setting the coefficients a11 to a55 in the way described above, the data R16 shown in FIGS. 3 and 4 is an integrated value of the pixel data driven at timing different from that of the watched pixel (p33) among the pixels generating the halation light emission at the watched pixel (p33). Moreover, the data R12 is an integrated value of the pixel data driven at the same timing as that of the watched pixel (p33) among the pixels generating the halation light emission at the watched pixel (p33). Then, in the first embodiment, the data R16 and R12 are referred to as neighborhood data integrated values. Thus, by the neighborhood data integrator 20, three signals of the watched pixel data R15 and the neighborhood data integrated values R12 and R16 are output.

In the way described above, the processing of the neighborhood data integrator 20 is executed. Incidentally, although the processing of R is exemplified to be described in the processing of the neighborhood data integrator 20 described above, similar processing is executed to G and B. That is to say, in the processing of G, when image data G1 is input, watched pixel data G15, and neighborhood data integrated values G12 and G16 are output. In the processing of B, when image data B1 is input, watched pixel data B15, and neighborhood data integrated values B12 and B16 are output.

Next, referring to FIG. 3, the processing of the subsequent stages of the neighborhood data integrators 20 is described. The neighborhood data integrated values R16, G16 and B16 output from the neighborhood data integrators 20 are added to one another by the adder 6. If the output of the adder 6 is denoted by a reference mark W1, the output W1 is expressed by the following expression (13).

$$W1 = R16 + G16 + B16 \tag{13}$$

In the expression (13), W1 is the data obtained by integrating all of the data of R, G and B, each of which has been obtained by integrating the products of the multiplication of the data driven at timing different from that of the watched pixel (p33) among the data in the neighborhood of the watched pixel (p33) by the coefficients a11 to a15, a21 to a25, a41 to a45 and a51 to a55, respectively. That is to say, the data W1 is the data corresponding to the drive data C1 in the expressions (7), (9) and (10).

Moreover, the halation is a physical light emission caused by reflection electrons. Consequently, the halation itself is generated independent of R, G and B. That is to say, in the image display apparatus, the reflection electrons of R make the watched pixels of G and B emit light. Similarly, also the reflection electrons of G and B make the watched pixels of R and B, and R and G emit light, respectively. Consequently, for reducing the halation, it is necessary to subtract the halation data of the other colors from the data of the watched pixel.

Accordingly, the coefficient arithmetic operation unit 8 is configured in order that, after the coefficient arithmetic operation unit 8 has multiplied the inputted output data W1 by a predetermined coefficient, the coefficient arithmetic operation unit 8 may invert the sign of the product to output the inverted product. The coefficient of the multiplication is the ratio of the halation to the above-mentioned drive data, namely the proportionality constant k similar to one in the expression (10).

The value obtained by the multiplication of W1 by the predetermined coefficient corresponds to a value as a result of the evaluation of the amount of the incidence of the energy rays into the luminous body of the watched pixel which energy rays have been generated by the drives of the devices at the pixels driven at the timing different from that of the watched pixel among the pixels located in the neighborhood of the watched pixel. Consequently, output data W3 of the coefficient arithmetic operation unit 8 is expressed by the following expression (14).

$$W3 = -k \times W1 \tag{14}$$

On the other hand, the data R12, G12 and B12 output from the neighborhood data integrators 20 are input into the adder 7 to be added to one another. In the case where an output of the adder 7 is denoted by a reference mark W2, the output W2 is expressed by the following expression (15).

$$W2 = R12 + G12 + B12 \tag{15}$$

The above-mentioned output W2 is the data obtained by integrating all of the data of R, G and B, each of which has been obtained by integrating the products of the multiplication of the data driven at the same timing as that of the watched pixel among the data in the neighborhood of the watched pixel by the coefficients a31 to 35, respectively. That is to say, the data W2 is the data corresponding to the drive data C2 in the expressions (8) to (10).

Moreover, in the coefficient arithmetic operation unit 9, after the multiplication of the input data W2 by a predetermined coefficient, the sign of the multiplied data is inverted, and the product having the inverted sign is output. The coefficient is a proportionality constant k similarly to the case of the coefficient arithmetic operation unit 8. Consequently, output data W4 of the coefficient arithmetic operation unit 9 is expressed by the following expression (16).

$$W4 = -k \times W2 \tag{16}$$

Moreover, the output W4 of the coefficient arithmetic operation unit 9 is added to the data R15, G15 and B15 by the adders 11R, 11G and 11B, respectively, to be output as data R17, G17, and B17, respectively. If the processing is expressed by an expression, the expression is the following expression (17).

$$\left.\begin{array}{l} R17 = R15 + W4 = R15 - k \times W2 \\ G17 = G15 + W4 = G15 - k \times W2 \\ B17 = B15 + W4 = B15 - k \times W2 \end{array}\right\} \quad (17)$$

The pieces of data R17, G17 and B17 are multiplied by the outputs of LUTs 10R, 10G and 10b in the multipliers 12R, 12G and 12B, respectively, and are output as data R18, G18 and B18, respectively.

If drive data of a pixel is denoted by X, the gray-level displayed of R to the drive data X is denoted by γR(X), and the gradient of the gray-level displayed γR(X) to the drive data X is denoted by γR'(X), then the LUT 10R receives the input X, and outputs γR'(0)/γR'(X). Similarly, if the gray-level displayed of G to the drive data X is denoted by γG(X), and the gradient of the gray-level displayed γG(X) to the drive data X is denoted by γG'(X), then the LUT 10G receives the input X, and outputs γG'(0)/γG'(X). Moreover, if the gray-level displayed of B to the drive data X is denoted by γB(X), and the gradient of the gray-level displayed γB(X) to the drive data X is denoted by γB'(X), then the LUT 10B receives the input X, and outputs γB'(0)/γB'(X). Consequently, the outputs R18, G18 and B18 of the multipliers 12R, 12G and 12B are expressed by the following expression (18).

The value is one obtained by adjusting a value on the basis of the value of the drive data being an input signal according to the nonlinear characteristic between the drive data being the input signal and the gray-level displayed. The value to be adjusted is obtained by evaluating an amount of the incidence of the energy rays into the luminous body of the watched pixel. The incident energy rays have been generated by the drives of the devices at the pixels driven at the timing different from that of the watched pixel among the pixels in the neighborhood of the watched pixel.

$$\left.\begin{array}{l} R18 = W3 \times \dfrac{\gamma R'(0)}{\gamma R'(R15)} = -k \times W1 \times \dfrac{\gamma R'(0)}{\gamma R'(R15)} \\ G18 = W3 \times \dfrac{\gamma G'(0)}{\gamma G'(G15)} = -k \times W1 \times \dfrac{\gamma G'(0)}{\gamma G'(G15)} \\ B18 = W3 \times \dfrac{\gamma B'(0)}{\gamma B'(B15)} = -k \times W1 \times \dfrac{\gamma B'(0)}{\gamma B'(B15)} \end{array}\right\} \quad (18)$$

Moreover, the data R17 and the data R18 are added to each other by the adder 13R. Similar processing is performed also for G and B, and the respective outputs R19, G19 and B19 of the adders 13R, 13G and 13B are expressed by the following expressions.

$$\left.\begin{array}{l} R19 = R17 + R18 = R15 - k \times W1 \times \dfrac{\gamma R'(0)}{\gamma R'(R15)} - k \times W2 \\ G19 = G17 + G18 = G15 - k \times W1 \times \dfrac{\gamma G'(0)}{\gamma G'(G15)} - k \times W2 \\ B19 = B17 + B18 = B15 - k \times W1 \times \dfrac{\gamma B'(0)}{\gamma B'(B15)} - k \times W2 \end{array}\right\} \quad (19)$$

In these expressions, the reference mark W1 corresponds to C1 in the expression (10), and the reference mark W2 corresponds to C2 in the expression (10). Thereby, the corrections corresponding to the corrections shown in the expression (10) are performed, and the fall of chroma can be reduced. Incidentally, the limiters 14 are limiter circuits provided for outputting 0 in the case where the operation results of the adders 13R, 13G and 13B become negative.

As described above, in the image display apparatus according to the first embodiment, the correction circuits each for executing the correction of the input signal by subtracting a predetermined correction value from an input signal corresponding to the device of a watched pixel are provided at the preceding stages of the drive circuits in the image display apparatus. Then, as the correction value, the image display apparatus adopts a value determined on the basis of a value obtained by dividing an evaluation value by a differential coefficient in the neighborhood of an input signal corresponding to the watched pixel in a gray-level displayed characteristic depending on an input signal. The evaluation value has been obtained by evaluating an increase of the gray-level displayed of the watched pixel owing to the drives of the devices of the pixels located in an area where the halation around the watched pixel is generated which devices are driven at the timing different from that of the watched pixel. Thereby, the influences of the halation in the halation area can be reduced by the correction processing, and as a result, bad influences owing to the halation can be removed. Consequently, the image display apparatus capable of obtaining a good light emission state can be obtained.

Incidentally, here, the influences to the gray-level displayed of the watched pixel owing to the drives of the pixels (devices) driven at the same timing as that of the watched pixel are evaluated to correct the data corresponding to the watched pixel, and the influences to the gray-level displayed of the watched pixel owing to the drives of the pixels (devices) driven at the timing different from that of the watched pixel are evaluated to correct the data corresponding to the watched pixel. However, the data (the data to be corrected) corresponding to the watched pixel is not necessarily to be the data constituting the same frame as the frame of the corresponding data of the neighborhood pixels used for the calculation of the correction values, and the correction values calculated on the basis of the data of a certain frame can also be used for the correction of the data of another frame by utilizing the correlativity of data between neighborhood frames.

Second Embodiment

Next, an image display apparatus according to a second embodiment of the present invention is described. In the image display apparatus according to the second embodiment, spacers as shielding members for intercepting electrons are provided differently from the first embodiment. The spacers are severally a plate-like member arranged at the center between a certain pixel row and the pixel row under the former pixel row. Then, a description is given to a case where correction circuits are provided at the preceding stages of the drive circuits of the image display apparatus provided with the spacers and the correction processing of the neighborhood of the spacers is executed differently from the first embodiment. Incidentally, because the configurations and correction methods other than those to be described in the following are the same as those in the first embodiment (see FIGS. 3 and 4), the descriptions of the configurations and the correction methods are omitted.

That is to say, spacers as support members of the atmospheric pressure are normally provided in a SED. But, the spacers exist between luminous bodies and also function as shielding members for intercepting the electrons which are to be reflected by the luminous bodies on one side and enter into the luminous body on the other side. Consequently, in the neighborhood of the spacers, reflection electrons are intercepted by the spacers, and the diminishment of the intensity of halation is caused. Consequently, in the case where the correction processing similar to that to the pixels located not in the neighborhood of the spacers is performed to the pixels in the neighborhood of the spacers, the correction processing rather brings about overcorrection to the pixels in the neighborhood of the spacers. Accordingly, the second embodiment is configured differently from the first embodiment to alter the coefficients a11 to a55 in the neighborhood of the spacers, and to makes it possible to alter the values of the coefficients a11 to a55 in the neighborhood data integrators 20.

Figure 7:
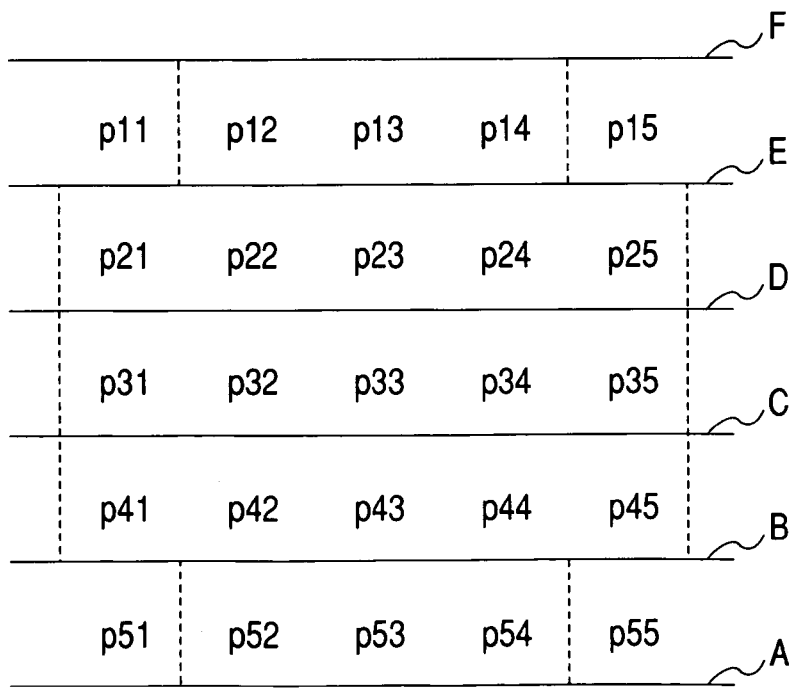
FIG. 7 is a schematic diagram showing arrangements of pixels and spacers in the periphery of the watched pixel according to the first embodiment of the present invention.

That is to say, as shown in FIG. 7, it is supposed similarly in the description of the first embodiment that the pixels in the area to be processed by the neighborhood data integrator 20 are p11 to p55. The coefficients a11 to a55 shown in FIG. 4 are the coefficients by which the pixel data of the pixels p11 to p55 is multiplied. Moreover, it is supposed in the second embodiment that the pixel rows are referred to as follows in order: the pixel row located over a spacer is referred to as "first over neighboring", the pixel row located over the first over neighboring is referred to as "second over neighboring", the pixel row located over the second over neighboring is referred to as "third over neighboring", and so forth. To put it concretely, for example, as shown in FIG. 7, in the case where the spacer is located at a position A, the first over neighboring is the row of the pixels p51 to p55. Moreover, the second over neighboring is the row of the pixels p41 to p45, and the third over neighboring is the row of the pixels p31 to p35. Furthermore, it is supposed that the pixel rows are referred to as follows in order: the pixel row located under a spacer is referred to as "first under neighboring", the pixel row located under the first under neighboring is referred to as "second under neighboring", the pixel row located under the second under neighboring is referred to as "third under neighboring", and so forth. To put it concretely, for example, as shown in FIG. 7, in the case where the spacer is located at a position B, the first under neighboring is the row of the pixels p51 to p55. Moreover, it is also supposed in the second embodiment that the vertical resolution of the display apparatus is 768 lines and 20 spacers are arranged with a space of 40 rows in between.

In FIG. 7, in the case where a spacer is located at the position A, the lower limit of the pixels generating reflection electrons irradiating the watched pixel p33 is the row of the pixels p51 to p55. The reflection electrons generated by the rows located at the pixels lower than the row of the pixels p51 to p55 do not irradiate the watched pixel p33 independent of the existence of the spacer. Consequently, the reflection electrons radiated to the watched pixel p33 are not intercepted by the spacer. Therefore, in the case where the spacer is located at the position A, the coefficients a11 to a55 are set to be the values shown in FIG. 5B similarly in the first embodiment.

Moreover, in the case where the spacer is located at the position B, the reflection electrons from the pixels located on the opposite side to the watched pixel p33 with regard to the spacer among the reflection electrons to be radiated to the watched pixel p33 are intercepted by the spacer. Moreover, the reflection electrons p51 and p55 are not radiated to the watched pixel p33 independent of the existence of the spacer. On the other hand, the reflection electrons from the pixels p52 to p54 are intercepted by the spacer.

The neighborhood data integrators 20 of the second embodiment are severally an arithmetic processing unit for calculating an integrated value of the drive data of the pixels influencing halation light emission to the watched pixel p33. Accordingly, it is necessary to exclude the pixel data which does not influence the halation light emission owing to the interception of the reflection electrons by a spacer from the integration. Therefore, in the case where the spacer is located at the position B in FIG. 7, the coefficients a52 to a54 take 0, and the coefficients a11 to a55 take the state of the values as shown in FIG. 8A.

Moreover, also in the case where the spacer is located at a position C as shown in FIG. 7, the reflection electrons to be radiated to the watched pixel are intercepted by the spacer. In this case, the reflection electrons of the pixels p41 to p45 and p52 to p54 located on the opposite side to the watched pixel with regard to the spacer are intercepted by the spacer. The reflection electrons of the pixels p51 and p55 are not radiated to the watched pixel p33 independent of the existence of the spacer. In this case, the coefficients a11 to a55 take the values shown in FIG. 8B.

In the above, the cases where the watched pixel p33 is located on the upper sides of the spacers have been described. On the other hand, in the case where a spacer is located at a position D, the watched pixel p33 is located on the lower side of the spacer. In this case, the reflection electrons of the pixels located on the lower side of the watched pixel p33 are not intercepted by the spacer. Therefore, the coefficients a31 to a55 on the lower side of the watched pixel p33 take the values similar to those of the first embodiment.

On the other hand, the reflection electrons of the pixels located on the upper side of the watched pixel p33 are intercepted by the spacer so that all of the coefficients a11 to a25 take 0. Moreover, in the case where the spacer is located at the position D, the coefficients a11 to a55 take the values shown in FIG. 8C. Similarly, in the case where a spacer is located at a position E of FIG. 7, the coefficients a11 to a15 of the pixels located on the opposite side to the watched pixel with regard to the spacer take 0, and the other coefficients take the values similar to those in the first embodiment. Consequently, in the case where the spacer is located at the position E, the coefficients a11 to a55 take the values shown in FIG. 8D. Moreover, in the case where the spacer is located at the position F, the reflection electrons radiated to the watched pixel p33 are not intercepted by the spacer again. Therefore, the coefficients in this case take the values shown in FIG. 5B similarly to the first embodiment.

Moreover, the switching of the coefficients described above is executed during a blanking period in a horizontal synchronization period. To put it concretely, for example, in the case where the spacer is located at the position A in FIG. 7, the values shown in FIG. 5B are set as the coefficients a11 to a55, respectively. In this case, the pixels p51 to p55 is the first over neighboring. That is to say, because the input data R1, G1 and B1 are the pixel data of the pixel p55, the input data is the date of the first over neighboring.

Next, in the case where the spacer is located at the position B in FIG. 7, the pixels p51 to p55 are the first under neighboring, and the input data R1, G1 and B1 are the data of the first under neighboring. In this case, the values shown in FIG. 8A are set as the coefficients a11 to a55, respectively. Then, the coefficients a11 to a55 are switched from the values shown in FIG. 5B to the values shown in FIG. 8A in the blanking period between the switching of the input data from the data of the first over neighboring to the data of the first under neighboring.

Next, in the case where the spacer is located at the position C in FIG. 7, the pixels p51 to p55 are the second under neighboring. That is to say, the input data R1, G1 and B1 are the data of the second under neighboring. In this case, the values shown in FIG. 8B are set as the coefficients a51 to a55, respectively. Then, the coefficients a51 to a55 are switched from the values shown in FIG. 8A to the values shown in FIG. 8B in the blanking period between the switching of the input data from the data of the first under neighboring to the data of the second under neighboring.

Similarly, the coefficients a11 to a55 are switched from the values shown in FIG. 8B to the values shown in FIG. 8C in the blanking period between the switching of the input data from the data of the second under neighboring to the data of the third under neighboring. Moreover, the coefficients a11 to a55 are switched from the values shown in FIG. 8C to the values shown in FIG. 8D in the blanking period between the switching of the input data from the data of the third under neighboring to the data of the fourth under neighboring. Moreover, the coefficients a11 to a55 are switched from the values shown in FIG. 8D to the values shown in FIG. 5B in the blanking period between the switching of the input data from the data of the fourth under neighboring to the data of the fifth under neighboring.

As described above, the neighborhood data integrated values R16, G16 and B16 are composed of only the data of the reflection electrons irradiating the watched pixel p33 without including the data for the reflection electrons intercepted by the spacers.

As described above, according to the second embodiment, the effects similar to those of the first embodiment can be obtained. Furthermore, in the image display apparatus provided with the spacers such as plate-like members between pixels, it is possible to perform suitable correction processing also in the neighborhood of the spacers without performing the correction pertaining to the halation intercepted by the spacers, and to obtain an image display apparatus capable of securing a good luminous characteristic.

Third Embodiment

Next, a correction method according to a third embodiment of the present invention is described. In the third embodiment, descriptions are given to an example of giving the data for halation to the data of the pixels in the neighborhood of the spacers.

Reflection electrons are normally intercepted by the spacers in the neighborhood of the spacers in an image display apparatus. Consequently, the intensity of the halation is diminished from that in the areas not in the neighborhood of the spacers, and luminance shading and color shading are generated. In the third embodiment, correction processing is not executed in the areas not in the neighborhood of the spacers, and the correction processing is executed only to the areas in the neighborhood of the spacers. Thereby, the degrees of the luminance and the chromaticity of the pixels in the neighborhood of the spacers can be preserved similarly to the degrees of those of the pixels not in the neighborhood of the spacers.

That is to say, similarly to the second embodiment, the spacers are formed of plate-like members each arranged at the center between a certain pixel row and a row under the pixel row also in the third embodiment. Moreover, it is supposed that the vertical resolution of the display apparatus is 768 lines and 20 spacers are arranged with a space of 40 rows in between similarly to the second embodiment. On the other hand, differently from the second embodiment, in the third embodiment, the amounts of the halation intercepted by the spacers are calculated, and the estimation amounts of the intercepted halation are added to the data of the watched pixel. Thereby, the generation of luminance shading and color shading is diminished.

In case of the configuration in which the spacers are arranged between rows and rows, there is the case where the halation from the pixels located on the same row as that of a watched pixel is not intercepted by any of the spacers while the halation from the pixels which are located on rows different from that of the watched pixel and are driven at the timing different from that of the watched pixel is intercepted by the spacers.

Consequently, in the case where the drive data of the watched pixel is denoted by X and the drive data after the correction of the drive data X is denoted by X', the expression (10) in the first embodiment is expressed as the following expression (20) in the third embodiment.

$$X' = X + k \times C3 \times \frac{\gamma'(0)}{\gamma'(X)} \quad (20)$$

Hereupon, the reference mark C3 denotes the summation of the drive data of the pixels which are located in the halation area of the watched pixel, and the halation of which is intercepted by the spacers.

Figure 9:
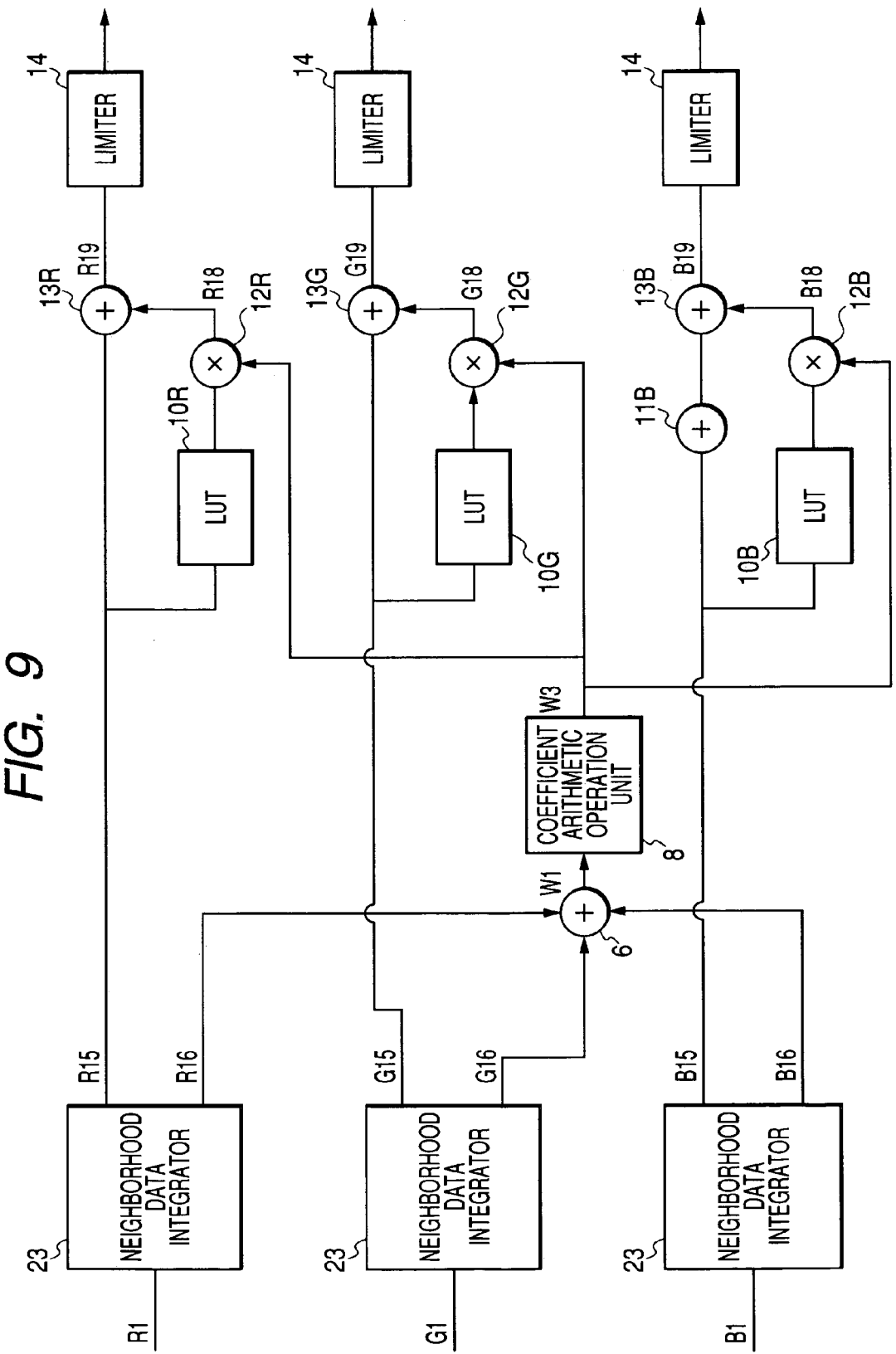
FIG. 9 is a block diagram showing the configuration of a correction circuit of an image display apparatus according to a third embodiment of the present invention.
Figure 10:
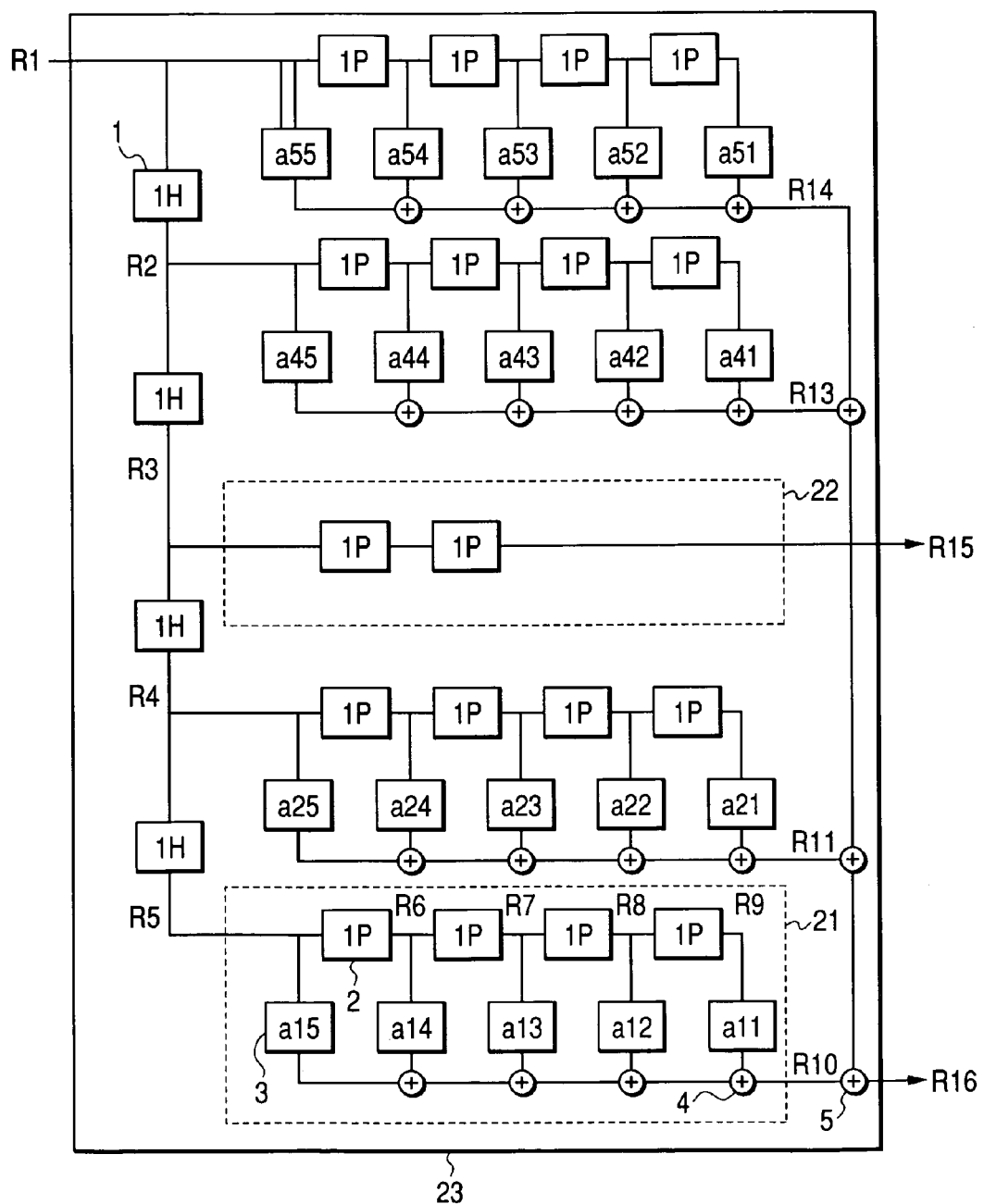
FIG. 10 is a block diagram showing the details of a neighborhood data integrator according to the third embodiment of the present invention.

The principal part of a correction circuit according to the third embodiment is shown in FIG. 9, and a neighborhood data integrator is shown in FIG. 10. As shown in FIG. 9, the principal part of the correction circuit according to the third embodiment is different from those of the first and the second embodiments in that the outputs of the neighborhood data integrators 23 are composed of a couple of pieces of data R15 and R16, a couple of pieces of data G15 and G16, and a couple of pieces of data B15 and B16, respectively. Moreover, the principal part of the correction circuit according to the third embodiment is also different from those of the first and the second embodiments in that the adder 7 for processing the data R12, G12 and B12 is not provided and the sign of the output of the coefficient arithmetic operation unit 8 is not inverted at the time of being output. Furthermore, as shown in FIG. 10, the third embodiment is different from the first embodiment in that the coefficients a31 to a35 shown in FIG. 4, by which the data of the row 22 are multiplied, do not exist, and that the adder capable of calculating the data R12 is not provided. Because the other configurations of the third embodiment are similar to those of the first embodiment, their descriptions are omitted.

First, the case where the watched pixel does not exist in the neighborhood of the spacers is described. An examination is given to the case where a spacer exists in the position A or F, or exists on the outside of the positions A and F in view of the watched pixel p33 in FIG. 7. In other words, the cases are equivalent to the inexistence of the watched pixel p33 between the second over neighboring and the second under neighboring. In this case, because the reflection electrons radiated to the watched pixel p33 are not intercepted by any of the spacers, luminance shading and color shading are not generated.

In the third embodiment, the neighborhood data integrators 23 calculate data integrated values of the pixels which emit the reflection electrons irradiating the watched pixel to be intercepted by the spacers. In this case, because no pixels are intercepted by the spacers, all of the coefficients a11 to a25, and a41 to a55 are set to be 0, as shown in FIG. 11A. FIGS. 11A, 11B, 11C, 11D and 11E are views similar to FIGS. 8A, 8B, 8C and 8D. In case of the third embodiment, because there are not the coefficients a31 to a35, their positions are shown as blanks. All of the output data R16, G16 and B16 of the neighborhood data integrators 23 of FIG. 9 become 0, and the output data W1 of the adder 6 for adding these pieces of data also becomes 0.

Here, in the first and the second embodiments described above, as the coefficient arithmetic operation unit 8, a coefficient arithmetic operation unit for multiplying the data W1 by the coefficient k and inverting the sign of the obtained product to output the inverted product is used. On the other hand, in the third embodiment, as the coefficient arithmetic operation unit 8, a coefficient arithmetic operation unit for multiplying an input signal by the coefficient k and output the obtained product without inverting the sign of the product is used. Incidentally, because the input signal W1 is 0 here, the output data W3 of the coefficient arithmetic operation unit 8 is also 0.

The output data W3 of the coefficient arithmetic operation unit 8 is multiplied by the output of the LUT 10R by the multiplier 12R to be the output data R18 before being added to the data R15 by the adder 13R. In this case, because the data W3 is 0, the data R18 also becomes 0, and the output data R19 of the adder 13R becomes the same as the data R15. Moreover, similar processing is performed as to G and B, and the respective output data G19 and B19 of the respective adders 13G and 13B become the same as the data G15 and B15, respectively. As the result, the data in the state of receiving no correction processing is displayed.

As described above, in case of the state in which the watched pixel is not located in the neighborhood of the spacers, no correction processing is executed and the input data is displayed as it is in the third embodiment.

Next, the case where the watched pixel p33 exists in the neighborhood of the spacers is described. As shown in FIG. 7, in the case where a spacer exists at the position B, the reflection electrons of the pixels located on the opposite side to the watched pixel p33 with regard to the spacer among the reflection electrons radiated to the watched pixel p33 are intercepted by the spacer. Consequently, the reflection electrons of the pixels p51 and p55 do not irradiate the watched pixel p33 independent of the existence of the spacer. Incidentally, the reflection electrons of the pixels p52 to p54 are intercepted by the spacer.

In case of the third embodiment, the neighborhood data integrators 23 calculate the data integrated value of the pixels emitting the reflection electrons which are intercepted by the spacer before irradiating the watched pixel. Consequently, in the case where the spacer is located at the position B in FIG. 7, the coefficients a52 to a54 become 1 and the other coefficients become 0. The coefficients a11 to a25 and a31 to a55 are in the state shown in FIG. 11B.

Then, the outputs of the neighborhood integrators 23 are added to one another by the adder 6 to be the output data W1. The output data W1 is an integrated value of the drive data of the pixels from which the halation is intercepted by the spacer among the pixels driven at the timing different from that of the watched timing.

That is to say, the data W1 corresponds to the summation data C3 in the expression (20) described above. Moreover, after the data W1 has been made to be proportionality constant times (k times) by the coefficient arithmetic operation unit 8, the data W1 is multiplied by the output of the LUT 10R, and then is added to the data R15 by the adder 13R. The processing is similarly executed to G and B. Consequently, the outputs of the adders 13R, 13G and 13B are expressed by the following expression (21).

$$\left.\begin{array}{l} R19 = R15 + k \times W1 \times \dfrac{\gamma R'(0)}{\gamma R'(R15)} \\ G19 = G15 + k \times W1 \times \dfrac{\gamma G'(0)}{\gamma G'(G15)} \\ B19 = B15 + k \times W1 \times \dfrac{\gamma B'(0)}{\gamma B'(B15)} \end{array}\right\} \quad (21)$$

According to the expression (21), the correction processing corresponding to that of the expression (20) is executed. Incidentally, in the third embodiment, the limiters 14 are provided at the subsequent stages of the respective adders 13R, 13G and 13B for limiting the outputs of the respective adders 13R, 13G and 13B in order not to exceed the maximum value which the drive data can take.

Moreover, in the case where the spacer is located at the position C in FIG. 7, the reflection electrons which are to irradiate the watched pixel are intercepted by the spacer. In this case, the reflection electrons of the pixels p41 to p45 and p51 to p55 located on the opposite side to the watched pixel with regard to the spacer are intercepted by the spacer. Because the coefficients of the pixels emitting the reflection electrons which are intercepted by the spacer are 1 in the third embodiment, the coefficients a11 to a25 and a41 to a55 take values as shown in FIG. 11C. In this case, the output data W1 of the adder 6 corresponds to the data for the halation which has not irradiated the watched pixel owing to the interception by the spacer.

Moreover, in the case where the spacer is located at the position D in FIG. 7, the pixels emitting the reflection electrons which are intercepted by the spacer are located on the upper side of the spacer. The coefficients a11 to a25 and a41 to a55 take the values as shown in FIG. 11D. Similarly, in the case where a spacer is located at the position E in FIG. 7, the coefficients a11 to a25 and a41 to a55 take the values as shown in FIG. 11E. Moreover, the switching of the coefficients described above is executed during a blanking period in a horizontal synchronization period. Incidentally, because the switching operation is similar to that in the second embodiment, its description is omitted.

As described above, according to the correction method of the third embodiment, by performing the correction of the neighborhood of the spacers by giving the data for the halation intercepted by the spacers to the drive data of the watched pixel as the correction data, the luminous shading and the color shading in the neighborhood of the spacers and not in the neighborhood of the spacers can be diminished.

In the above, the embodiments of the present invention have been described concretely. The present invention is not limited to the above-mentioned embodiments, and various modifications based on the technical idea of the present invention can be performed. To put it concretely, the present invention can be similarly applied to the configuration using an ultraviolet ray as an energy ray such as a plasma display.

Moreover, a high definition television apparatus can be configured by using the image display apparatus described above.

(Television Apparatus)

Figure 12:
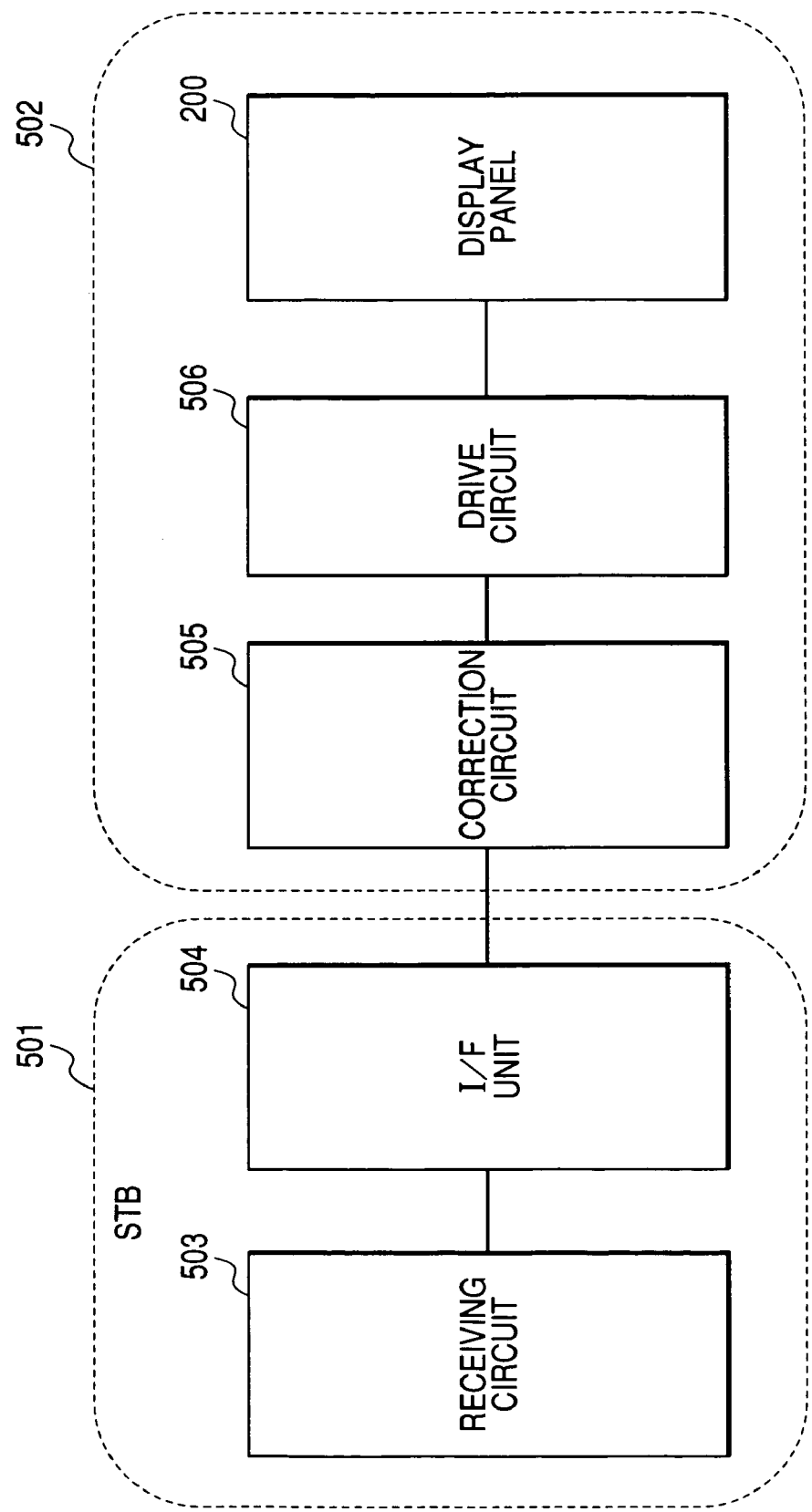
FIG. 12 is a block diagram showing the configuration of a television apparatus using an image display apparatus according to an embodiment of the present invention.

A television apparatus to which the present invention is applied is described with reference to FIG. 12. FIG. 12 is a block diagram of the television apparatus according to the present invention. The television apparatus is provided with a set top box (STB) 501 and an image display apparatus 502 described with regard to the above embodiments.

The set top box (STB) 501 includes a receiving circuit 503 constituting a receiving unit, and an I/F unit 504. The receiving circuit 503 is composed of a tuner, a decoder and the like. The receiving circuit 503 receives television signals such as satellite broadcasting and ground waves, data broadcasting through networks, and the like, and outputs decoded image data to the I/F unit 504. The I/F unit 504 converts the image data into the display format of the image display apparatus 502 to output the converted image data to the image display apparatus 502.

The image display apparatus 502 includes a display panel 200, a correction circuit 505 and a drive circuit 506. The correction circuit 505 is a circuit for correction shown in FIGS. 3 and 9. The drive circuit 506 generates a modulating signal on the basis of the image signal output from the correction circuit 505. The modulating signal is applied to the modulation wiring of the display panel shown in FIG. 13.

Because the display panel includes a plurality of modulation wires, the drive circuit 506 includes a plurality of modulating signal outputting units in order to correspond to each modulation wire. Although modulating signals are output from the respective modulating signal outputting units to the respective modulation wires, the outputs from the respective modulating signal outputting units to the respective modulation wires are collectively shown in one line in FIG. 13. The image data from the I/F unit 504 is once decoded to RGB signals by the image signal input unit, and the RGB signals are input into the correction circuit.

Incidentally, the receiving circuit 503 and the I/F unit 504 may be housed in a housing separated from the image display apparatus 502 as the set top box (STB) 501. Alternatively, the receiving circuit 503 and the I/F unit 504 may be housed in the same housing as that of the image display apparatus 502.

This application claims priority from Japanese Patent Application Nos. 2004-078452 filed Mar. 18, 2004 and 2004-365531 filed Dec. 17, 2004, which are hereby incorporated by reference herein.

What is claimed is:

1. An image display apparatus comprising:
   a plurality of pixels including first and second pixels neighboring each other, each pixel including (a) a device generating energy rays and (b) a luminous body irradiated with the energy rays to emit light according to an amount of the energy rays so as to display in a gray level;
   a correction circuit for correcting an input data corresponding to the gray level of the first pixel on the basis of a correction value, and for outputting corrected data by correcting the input data; and
   a drive circuit for driving the first pixel according to the corrected data,
   wherein the correction value is obtained by adjusting a value in accordance with a nonlinear characteristic between the input data corresponding to the gray level which the first pixel displays and the gray level which the first pixel displays,
   wherein the value to be adjusted corresponds to a part of the energy rays, which is generated by driving the device of the second pixel, and which irradiates the luminous body of the first pixel, and
   wherein the correction value is obtained by dividing the value to be adjusted by a gradient of a curve, which expresses the nonlinear characteristic, at a neighborhood of the input data corresponding to the gray level which the first pixel displays.

2. An image display apparatus comprising:
   a plurality of pixels including first and second pixels neighboring each other, each pixel including (a) a device generating energy rays and (b) a luminous body irradiated with the energy rays to emit light according to an amount of the energy rays so as to display in a gray level;
   a shielding member for shielding the luminous body of the first pixel from a part of the energy rays generated by driving the device of the second pixel;
   a correction circuit for correcting an input data corresponding to the gray level of the first pixel on the basis of a correction value, and for outputting corrected data by correcting the input data; and
   a drive circuit for driving the first pixel according to the corrected data,
   wherein the correction value is obtained by adjusting a value in accordance with a nonlinear characteristic between the input data corresponding to the gray level which the first pixel displays and the gray level which the first pixel displays,
   wherein the value to be adjusted corresponds to a part of the energy rays, which is generated by driving the device of the second pixel, and which is shielded by the shielding member from irradiating the luminous body of the first pixel, and
   wherein the correction value is obtained by dividing the value to be adjusted by a gradient of a curve, which expresses the nonlinear characteristic, at a neighborhood of the input data which corresponds to the gray level which the first pixel displays.

* * * * *